(12) United States Patent
Yamanaka et al.

(10) Patent No.: US 8,096,180 B2
(45) Date of Patent: Jan. 17, 2012

(54) INERTIAL SENSOR

(75) Inventors: Kiyoko Yamanaka, Tachikawa (JP); Heewon Jeong, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 12/273,068

(22) Filed: Nov. 18, 2008

(65) Prior Publication Data

US 2009/0126491 A1 May 21, 2009

(30) Foreign Application Priority Data

Nov. 19, 2007 (JP) .................................. 2007-299210
Sep. 1, 2008 (JP) .................................. 2008-223182

(51) Int. Cl.
*G01P 9/04* (2006.01)
*G01C 19/56* (2006.01)

(52) U.S. Cl. ................................. 73/504.12; 73/504.14

(58) Field of Classification Search ............... 73/514.32, 73/514.36, 514.38, 504.04, 504.12, 504.14, 73/504.15, 504.16
See application file for complete search history.

(56) References Cited

U.S. PATENT DOCUMENTS

| | | | |
|---|---|---|---|
| 5,756,901 A * | 5/1998 | Kurle et al. ..................... 73/777 |
| 5,780,885 A * | 7/1998 | Diem et al. ..................... 257/254 |
| 6,960,488 B2 * | 11/2005 | Brosnihan et al. .............. 438/52 |
| 7,000,471 B2 * | 2/2006 | Ito .................................. 73/504.12 |
| 7,062,970 B2 * | 6/2006 | Higuchi ......................... 73/504.12 |
| 7,096,732 B2 * | 8/2006 | Katsumata et al. ........ 73/504.12 |
| 7,155,976 B2 * | 1/2007 | Kai-Cheng et al. ........ 73/504.04 |
| 7,617,729 B2 * | 11/2009 | Axelrod et al. ............. 73/514.32 |
| 7,712,366 B2 * | 5/2010 | Beyeler et al. .............. 73/514.32 |

FOREIGN PATENT DOCUMENTS

JP 11-173851 A 7/1999

\* cited by examiner

*Primary Examiner* — Helen C. Kwok
(74) *Attorney, Agent, or Firm* — Miles & Stockbridge P.C.

(57) ABSTRACT

Techniques capable of suppressing fixation between a movable electrode and a fixed electrode in an inertial sensor and preventing the inertial sensor from malfunctioning are provided. The movable electrode, the fixed electrode provided so as to face the movable electrode, a peripheral conductor facing both the movable electrode and the fixed electrode, and a demodulation circuit and a voltage adjustment circuit which adjust the electric potential of the peripheral conductor so that the electric potential of the peripheral conductor becomes the same as the electric potential of the movable electrode are provided, and a change in the capacitance between the movable electrode and the fixed electrode is detected.

9 Claims, 14 Drawing Sheets

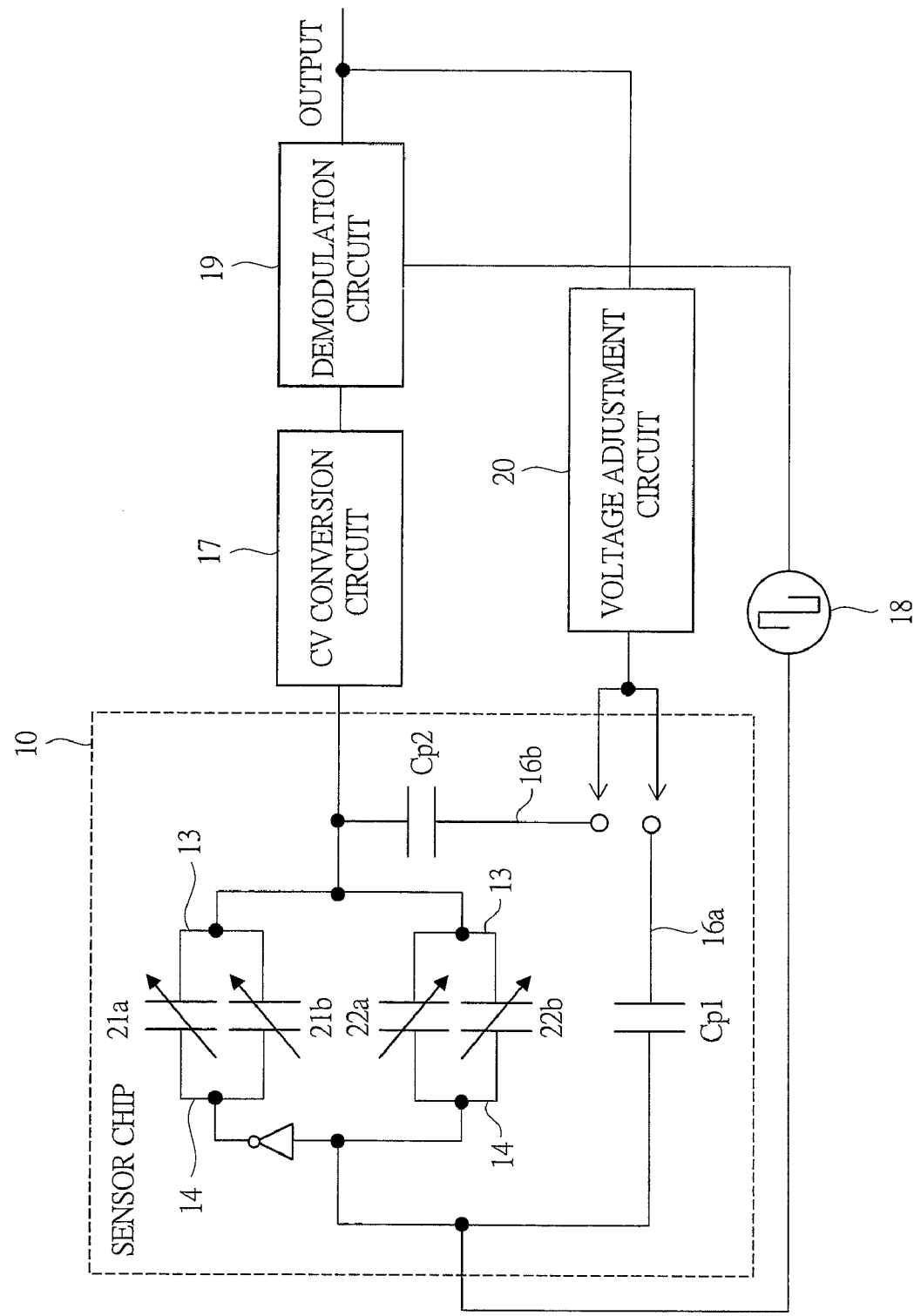

INERTIAL SENSOR

CROSS-REFERENCE TO RELATED APPLICATION

The present application claims priority from Japanese Patent Application No. JP 2007-299210 filed on Nov. 19, 2007 and Japanese Patent Application No. JP 2008-223182 filed on Sep. 1, 2008, the contents of which are hereby incorporated by reference into this application.

TECHNICAL FIELD OF THE INVENTION

The present invention relates to a semiconductor physical quantity sensor, and in particular to an inertial sensor fabricated by using Micro-Electro-Mechanical Systems (MEMS) techniques and used in detection of a change of electrostatic capacitance.

BACKGROUND OF THE INVENTION

As the techniques studied by the inventors of the present invention, for example, following techniques are conceivable in an inertial sensor.

By virtue of progresses in semiconductor processing techniques and micro machining techniques (so-called MEMS techniques), a MEMS inertial sensor element which has a detection circuit and detects physical quantities by the detection circuit has been widespread. For example, there is a system in which the gradient of a cellular phone is detected by an acceleration sensor which is a type of inertial sensors, thereby varying the direction of an output screen. Moreover, there is also a system in which the rotation angle of a vehicle body is detected in real time by an angular velocity sensor which is a type of inertial sensors, thereby controlling the running state of the vehicle body. Since sensor elements are generally used for a long period of time at a high temperature under the environment having many noises, durability is required for the sensors.

A MEMS inertial sensor processed/fabricated from a silicon wafer comprises: fixed electrodes; movable electrodes; an inertial body; and others. When physical force acts on the inertial body, the moved distance of the inertial body is detected by an electrostatic capacitance change between the fixed electrodes and the movable electrodes, thereby calculating the physical amount acted on the inertial body.

When the MEMS inertial sensor is to be formed by using a silicon wafer, the silicon wafer is processed by the deep etching technique of silicon. The deep etching technique is the processing technique in which chemical etching mainly using $SF_6$ gas and chemical film formation mainly using $CF_4$ gas are repeatedly carried out. The thickness of the silicon wafer forming the inertial body is 400 to 750 micrometers in many cases, and processing time of several tens of minutes to several hours is required for one silicon wafer when calculated from the etching rate of the deep etching of silicon. The long occupancy time of the deep etching is not preferred from the viewpoint of manufacturing cost. Therefore, in order to reduce the processing time by reducing the area to be etched, dummy pattern which does not directly contribute to the sensor performance is provided in the periphery of the patterns of the inertial body, the fixed electrodes, and the movable electrodes.

Also, if there are the regions having different aspect ratios of processing parts in the wafer plane when the inertial body is to be formed, the etching rate is varied. This is a phenomenon called the micro-loading effect, in which the etching rate becomes lower as the opening of the etched region becomes smaller. When a silicon wafer having a thickness of 400 to 750 micrometers is processed, the time taken until completion of the processing by the deep etching becomes longer in the part having finer patterns due to the micro-loading effect. The variation of the etching completion time due to the micro-loading effect is dependent also on the layout pattern. The etching rate of a fine pattern which takes the longest time is one third to one fourth of the etching rate of a large pattern for which etching is completed in the shortest time. Due to this variation of the etching completion time, the part of the processing patterns other than the fine patterns which take the longest time is exposed to a chemical substance serving as an etchant although etching thereof has been completed, and the processing excessively progresses. Thus, the difference is caused between the dimensions of the top part of the inertial body and the dimensions of the bottom part of the inertial body, and unpreferably the inertial body cannot be processed as it is designed. In order to control the processing dimension variation by suppressing the variation in the opening of the etched region, dummy pattern which does not directly contribute to the sensor performance is provided in the periphery of the inertial body pattern.

The dummy pattern provided in order to reduce the processing time or to control the variation in the processing dimensions is referred to as a "peripheral conductor". Other than that, a substrate fixing and supporting the movable electrodes, the fixed electrodes, and the dummy pattern and a conductive part such as a package surrounding or covering these structures are also referred to as "peripheral conductors". The peripheral conductors include single-crystal silicon and the single-crystal silicon above which an insulating film and a conductive film are formed. Further, when the inertial body and the peripheral conductors are made of single-crystal silicon, a natural oxide film having a thickness of about several nanometers is formed on the surface thereof after processing.

Note that techniques relating to such an inertial sensor include, for example, the techniques described in Japanese Patent Application Laid-Open Publication No. 11-173851.

SUMMARY OF THE INVENTION

Incidentally, the inventors of the present invention studied the techniques of the inertial sensor as described above and found out the following facts.

For example, when a minimum processing pattern by deep etching is several micrometers, the pattern of the peripheral conductor is generally set to have a distance of several tens of micrometers or less by which the pattern faces both the movable electrode and the fixed electrode. The mass of a silicon inertial body processed by deep etching is about several micrograms to several hundred micrograms and the silicon inertial body has a large ratio of the surface area with respect to the mass of the inertial body, and the phenomenon that the interaction between the pattern and the surface of the peripheral conductor is dominant is caused.

For example, during a fabrication process or when a sensor chip is to be mounted on a package, if a high voltage is applied to the sensor chip for some reason and static electricity is stored in the inertial body or if a charged external object and the sensor chip contact each other and static electricity is stored in the inertial body, static electricity force is generated between the movable electrodes and the fixed electrodes, the movable electrodes are attracted to the fixed electrodes, and the both electrodes are fixed to each other, thereby causing malfunction. At the same time, a large electric field is applied to the electrically insulating films on the surfaces of the electrodes, and induced charge or induced polarization occurs on the insulating surfaces. Even after the voltage from outside is removed, the electric charge distribution sometimes remains on the insulating surfaces, and the electrostatic force between the movable electrodes and the fixed electrodes via the electrically insulating films remains, thereby causing malfunction.

As described in the Patent Document 1 above, a stopper has been conventionally provided in order to prevent the fixation between the movable electrode and the fixed electrode. When the effective area by which the movable electrode surface and the fixed electrode surface contact with each other is reduced by providing the stopper, the possibility of generation of the induced charge or induced polarization on the electrode surfaces upon occurrence of the fixation can be reduced and the electrostatic force between the movable electrode and the fixed electrode via the electrically insulating films can be suppressed.

Even when the movable electrode and the fixed electrode are not fixed to each other, floating charge caused by induced charge and induced polarization is sometimes generated on the insulating surfaces between the movable electrode and the peripheral conductor. The electrostatic force caused by the floating charge is generated when physical force acts on the inertial body and the distance between the movable electrode of the inertial body and the peripheral conductor is changed. In this case, the movement of the inertial body becomes unstable, and precise physical amount cannot be detected.

In addition, even when the movable electrode and the fixed electrode are not fixed to each other, floating charge caused by the induced charge and induced polarization is sometimes generated on the insulating surfaces between the fixed electrode and the peripheral conductor. The inertial sensor calculates the physical amount acted on the inertial body by detecting the moved distance of the inertial body when the physical force acts on the inertial body based on the change in the electrostatic capacitance between the fixed electrode and the movable electrode. If parasitic capacitance caused by the floating charge between the fixed electrode and the peripheral conductor is present, there is a problem that the S/N ratio of the sensor output is lowered. Also, when the differential capacitance between the electrodes positioned on the left and right of the inertial body or above and below the inertial body is detected, there is a high possibility that the parasitic capacitance caused by the floating charge between the fixed electrode and the peripheral conductor becomes asymmetric at the left and right positions or the upper and lower positions, and offset of the sensor output occurs.

Therefore, an object of the present invention is to provide techniques capable of suppressing fixation between a movable electrode and a fixed electrode in an inertial sensor and preventing the inertial sensor from malfunctioning.

Also, another object of the present invention is to provide techniques capable of suppressing S/N ratio reduction of the sensor output and offset occurrence caused by the parasitic capacitance between a fixed electrode and a peripheral conductor in an inertial sensor.

The above and other objects and novel characteristics of the present invention will be apparent from the description of this specification and the accompanying drawings.

The typical ones of the embodiments disclosed in this application will be briefly described as follows.

More specifically, an inertial sensor according to a typical embodiment detects a change in the capacitance between a movable electrode and a fixed electrode and has a control circuit which adjusts the electric potential of a peripheral conductor so that the electric potential of the peripheral conductor facing both the movable electrode and the fixed electrode becomes the same as the electric potential of the movable electrode.

Also, an inertial sensor according to a typical embodiment detects a change in the capacitance between a movable electrode and a fixed electrode and has wiring which connects a third peripheral conductor with the movable electrode so that the electric potential of the third peripheral conductor, which faces the movable electrode and does not face the fixed electrode, becomes the same as the electric potential of the movable electrode.

Further, an inertial sensor according to a typical embodiment uses the fixed electrode as a drive electrode for driving the movable electrode and as a detection electrode for detecting the movement of the movable electrode as a change in the electrostatic capacitance, and a part of the peripheral conductor or the extended movable electrode is interposed so that the drive electrode and the detection electrode do not face with each other.

The effects obtained by typical embodiments disclosed in this application will be briefly described below.

(1) The fixation between the movable electrode and the fixed electrode can be suppressed, and the inertial sensor can be prevented from malfunctioning without increasing the number of fabrication processes of the inertial sensor.

(2) The S/N ratio reduction of the sensor output and offset occurrence caused by the parasitic capacitance between the fixed electrode and the peripheral conductor can be suppressed.

(3) The S/N ratio reduction of the sensor output and the offset occurrence can be suppressed by suppressing leakage of a drive signal to a detection signal caused by capacitive coupling of the drive electrode and the detection electrode.

BRIEF DESCRIPTIONS OF THE DRAWINGS

FIG. 2 is a circuit diagram of the inertial sensor according to the first embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference numbers throughout the drawings for describing the embodiments, and the repetitive description thereof will be omitted.

First Embodiment

Figure 1:
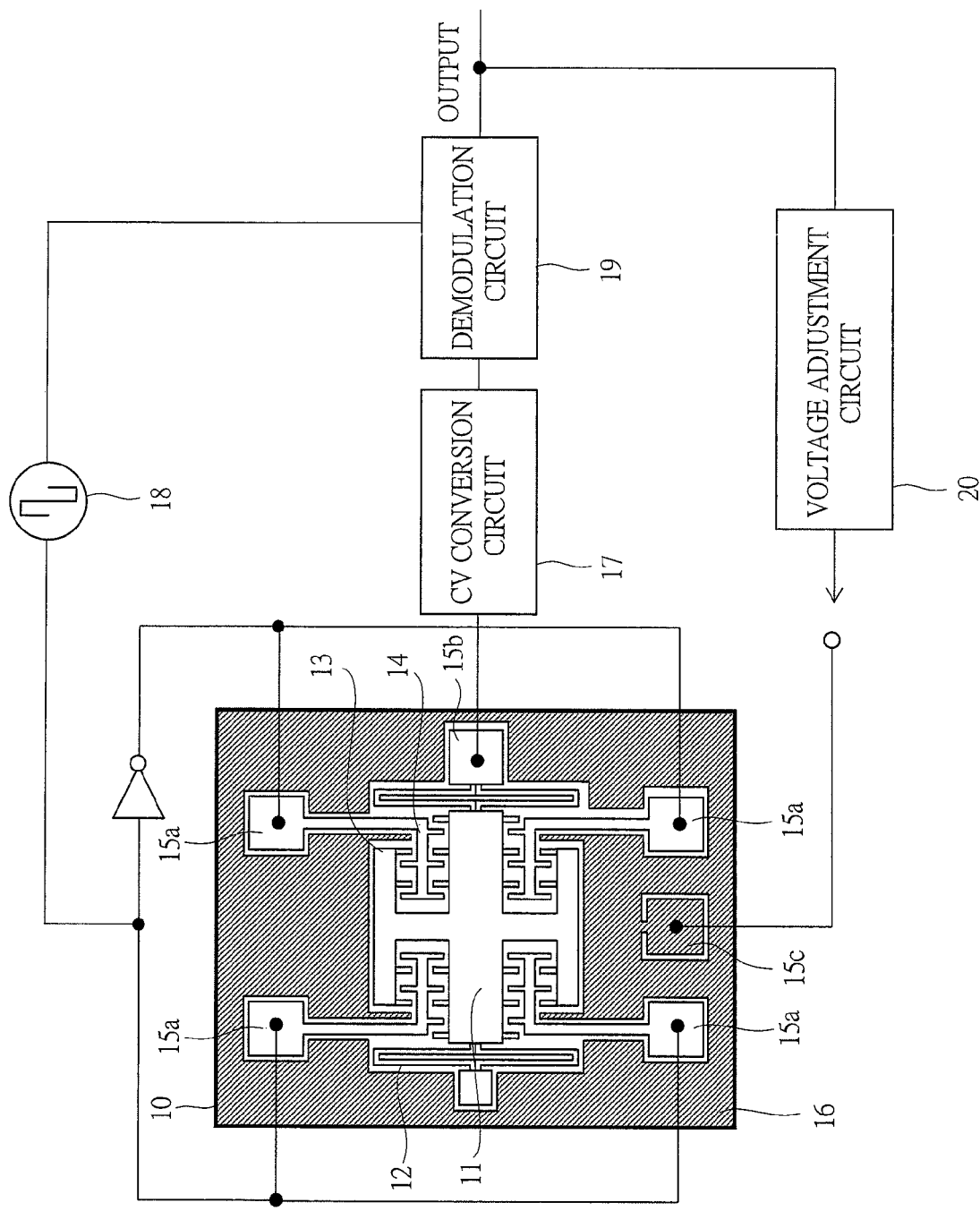
FIG. 1 is a wiring diagram of a chip and a detection circuit of an inertial sensor according to a first embodiment of the present invention.

FIG. 1 shows a schematic diagram of a chip overview and wiring of an acceleration sensor according to a first embodiment of the present invention.

The acceleration sensor serving as an inertial sensor according to the first embodiment comprises: a sensor chip 10; a capacitance/voltage (CV) conversion circuit 17 serving as a detection circuit; a carrier-wave application circuit 18; a demodulation circuit 19; a voltage adjustment circuit 20 serving as a control circuit; and others. An inertial mass 11, supporting beam structures 12 of the inertial body, movable electrodes 13 and fixed electrodes 14 for detecting the travel distance of the inertial body, and pad patterns 15a to 15c for connecting the sensor chip 10 with detection circuit elements are formed on the sensor chip 10. In addition, a peripheral conductor 16 is provided so as to surround the peripheries of these sensor constituent elements. Further, the fixed electrodes 14 are provided to face the movable electrodes 13, and the peripheral conductor 16 faces both the movable electrodes 13 and the fixed electrodes 14.

When acceleration is applied to the acceleration sensor, the inertial mass 11 is displaced in the opposite direction of the acceleration in accordance with the law of inertia. The amount of displacement at this point is calculated by a change in the electrostatic capacitance between the movable electrodes 13 and the fixed electrodes 14. Specifically, the change of the electrostatic capacitance between the pad patterns 15a connected to the fixed electrodes 14 and the pad patterns 15b connected to the movable electrodes 13 is converted into a voltage change by the capacitance/voltage (CV) conversion circuit 17 outside the sensor chip 10, and the amount of the change of the voltage is detected and converted to the amount of displacement of the inertial mass 11. The electric potential difference between the movable electrodes 13 and the fixed electrodes 14 is measured by a carrier wave generated and demodulated by the carrier-wave application circuit 18 and the demodulation circuit 19.

In this process, based on the voltage output from the demodulation circuit 19, the same electric potential as the electric potential of the movable electrodes 13 is applied via the voltage adjustment circuit 20 to the pad pattern 15c connected to the peripheral conductor 16 on the sensor chip 10. When the electric potentials of the peripheral conductor 16 and the movable electrodes 13 are made equal to each other, the operation of the acceleration sensor can be stabilized. The principles thereof will be described with reference to the circuit diagram shown in FIG. 2.

FIG. 2 is a circuit diagram rewritten from the schematic diagram of the sensor chip 10 shown in FIG. 1.

The sensor chip 10 comprises: two types of four capacitance-variable capacitors 21a, 21b, 22a, and 22b configured of the fixed electrodes 14 and the movable electrodes 13; a peripheral conductor (A) 16a which serves as parasitic capacitance with respect to the fixed electrodes 14; and a peripheral conductor (B) 16b which serves as parasitic capacitance with respect to the movable electrodes 13 and whose distance to the movable electrodes 13 is varied when the movable body is operated. When acceleration is applied to the acceleration sensor, the inertial mass 11 is displaced in the opposite direction of the acceleration in accordance with the law of inertia, and the electrostatic capacitance between the movable electrodes 13 and the fixed electrodes 14 is changed. In other words, the capacitance of the capacitance-variable capacitors 21a, 21b, 22a, and 22b is changed. The change in the capacitance values is converted to a voltage change by the capacitance/voltage conversion circuit 17 outside the sensor chip 10, and the amount of the change in the voltage is detected and converted into the amount of displacement of the inertial mass 11. The electric potential difference between the movable electrodes 13 and the fixed electrodes 14 is measured by the carrier waves generated and demodulated by the carrier-wave application circuit 18 and the demodulation circuit 19.

The peripheral conductor 16 has a portion (16a) serving as parasitic capacitance Cp1 with respect to the fixed electrodes 14 and a portion (16b) serving as a parasitic capacitance Cp2 with respect to the movable electrodes 13. Based on the voltage output from the demodulation circuit 19, the same electric potential as the electric potential of the movable electrodes 13 is applied to the peripheral conductor 16 (16a and 16b) via the voltage adjustment circuit 20. As a result, the effects of the parasitic capacitance caused by the peripheral conductor 16 can be suppressed without affecting the capacitance values of the capacitance-variable capacitors 21a, 21b, 22a, and 22b configured of the fixed electrodes 14 and the movable electrodes 13. The principles thereof will be described with reference to the circuit diagrams shown in FIGS. 3A and 3B.

Figure 3A:
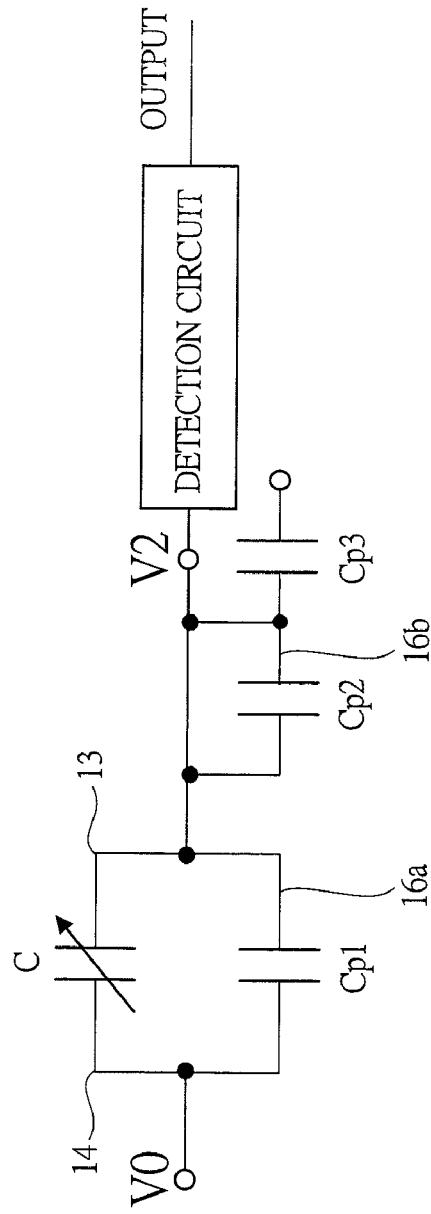
FIG. 3A is a diagram in which the parasitic capacitance generated in the first embodiment of the present invention is directly electrically connected to movable electrodes so as to achieve the same electric potential.

FIG. 3A is a circuit diagram of the case in which the peripheral conductors 16a and 16b described in FIG. 2 are directly connected to the movable electrodes 13 without the interposition of the voltage adjustment circuit 20. In the case of the configuration of FIG. 3A, even when the electric potential difference (V2−V0) between the movable electrodes 13 and the fixed electrodes 14 of the sensor is measured by the detection circuit, if the parasitic capacitance Cp1 undergoes a temporal change due to temperature variation, vibrations and others, the electric potential difference (V2−V0) between the movable electrodes 13 and the fixed electrodes 14 is also affected, and therefore, the capacitance C of the capacitance-variable capacitors 21a, 21b, 22a, and 22b cannot be precisely and uniquely obtained.

Although the electric capacitance Cp2 has the same electric potentials at both ends thereof and has 0 as capacitance, new parasitic capacitance Cp3 having an unspecified electric potential is generated between the parasitic capacitance Cp2 and the periphery.

Figure 3B:
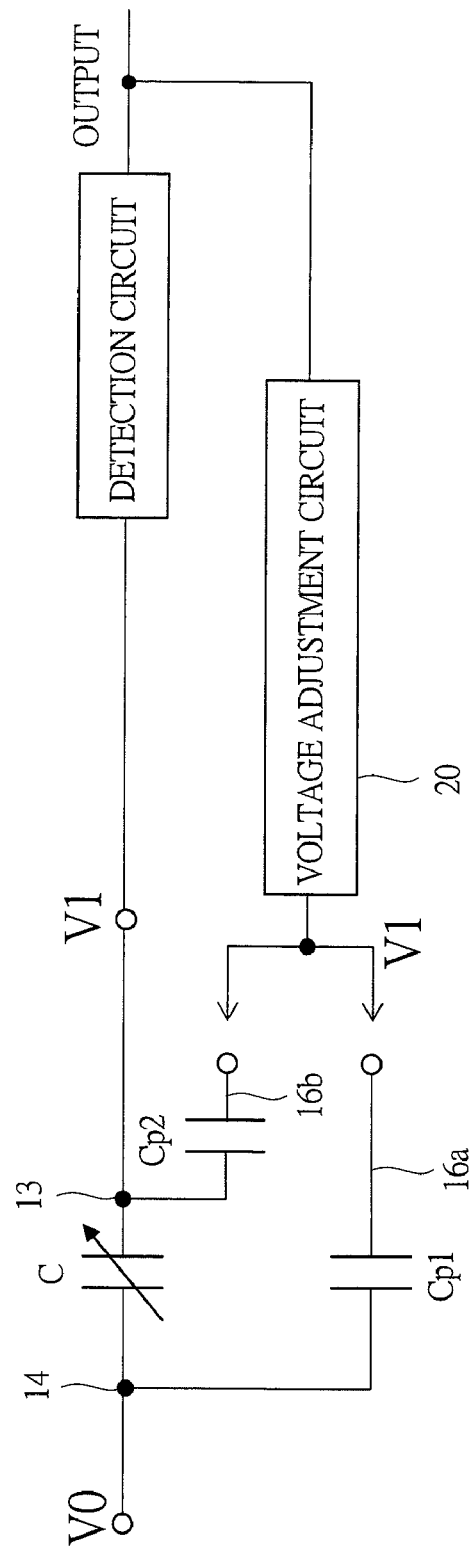
FIG. 3B is a diagram in which the parasitic capacitance generated in the first embodiment of the present invention is made to have the same electric potential as the movable electrodes via a voltage adjustment circuit.

FIG. 3B is a circuit diagram of the case in which the same electric potential V1 as that of the movable electrodes 13 is applied to the peripheral conductors 16a and 16b via the voltage adjustment circuit 20. In the case of the configuration of FIG. 3B, even when the values of the parasitic capacitances Cp1 and Cp2 undergo temporal changes, the electric potential difference (V1–V0) between the movable electrodes 13 and the fixed electrodes 14 is not affected. Therefore, the capacitance C of the capacitance-variable capacitors 21a, 21b, 22a, and 22b can be always precisely obtained.

When the same electric potential as the electric potential of the movable electrodes 13 is applied to the peripheral conductor 16 (16a and 16b) via the voltage adjustment circuit 20 in this manner based on the voltage output from the demodulation circuit 19, the effects of the parasitic capacitance caused by the peripheral conductor 16 can be suppressed without affecting the capacitance values of the capacitance-variable capacitors 21a, 21b, 22a, and 22b configured of the fixed electrodes 14 and the movable electrodes 13. In other words, fixation between the movable electrodes 13 and the fixed electrodes 14 is suppressed so as to prevent the sensor from malfunctioning, and the S/N ratio reduction of the sensor output and occurrence of offset caused by the parasitic capacitance between the fixed electrodes 14 and the peripheral conductor 16 can be suppressed.

Second Embodiment

Figure 4:
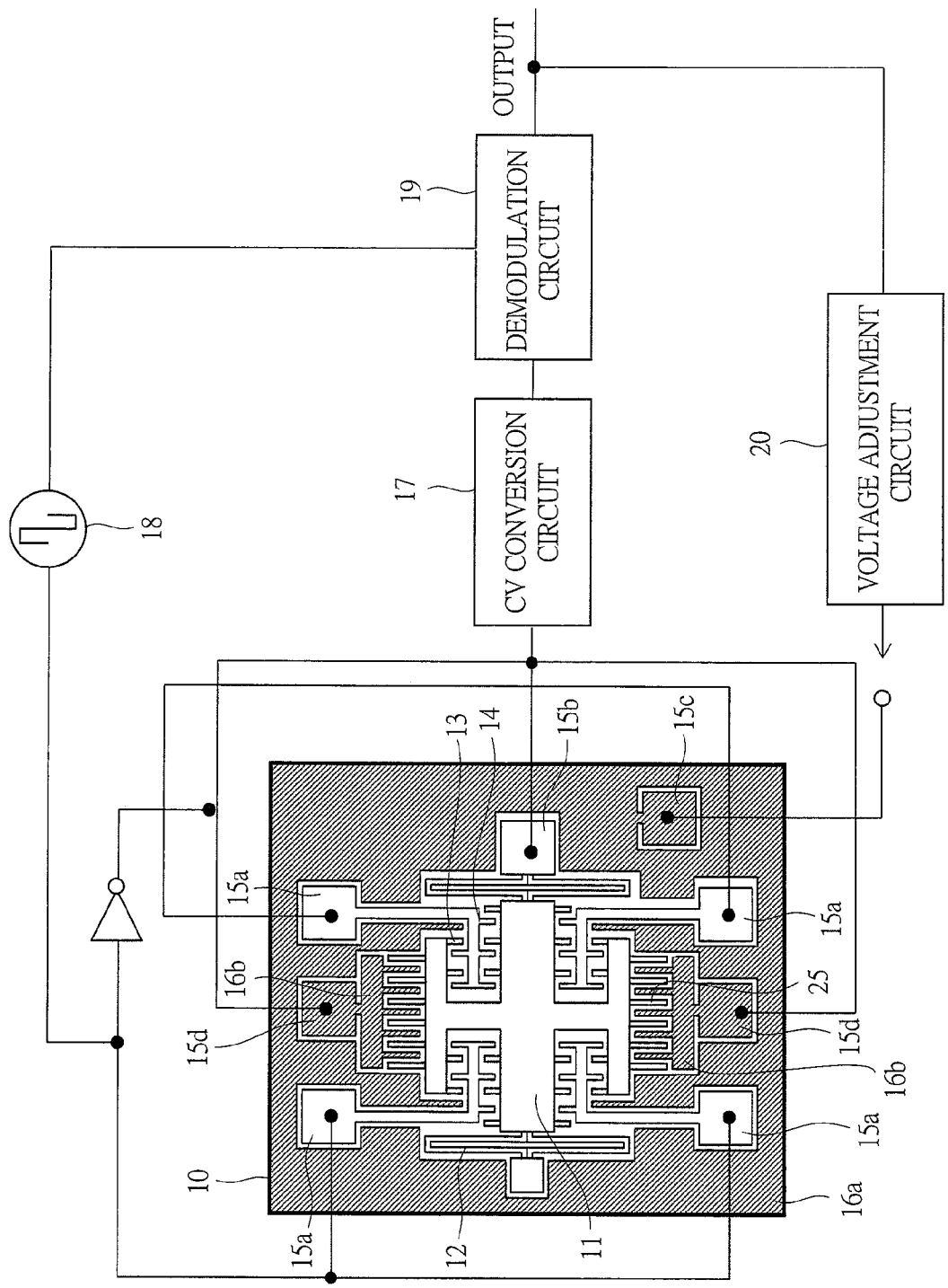
FIG. 4 is a wiring diagram of a chip and a detection circuit of an inertial sensor according to a second embodiment of the present invention.

FIG. 4 shows a schematic diagram of a chip overview and wiring of an acceleration sensor according to a second embodiment of the present invention.

The acceleration sensor serving as an inertial sensor according to the second embodiment comprises: the sensor chip 10; the capacitance/voltage (CV) conversion circuit 17 serving as a detection circuit; the carrier-wave application circuit 18; the demodulation circuit 19; the voltage adjustment circuit 20 serving as a control circuit; and others. The inertial mass 11, the supporting beam structures 12 of the inertial body, the movable electrodes 13 and the fixed electrodes 14 for detecting the travel distance of the inertial body, restriction means 25 which restricts the operation of the acceleration sensor, and pad patterns 15a to 15d for connecting the sensor chip 10 with detection circuit elements are formed on the sensor chip 10. In addition, the peripheral conductors 16a and 16b are provided so as to surround the peripheries of these sensor constituent elements. Also, the fixed electrodes 14 are provided to face the movable electrodes 13. The peripheral conductor 16a comprises a first peripheral conductor which is faced to both the movable electrode 13 and the fixed electrode 14 and a second peripheral conductor which is faced to the fixed electrode 14 and not faced to the movable electrode 13. The peripheral conductor 16b comprises a third peripheral conductor which is faced to the movable electrode 13 and not faced to the fixed electrode 14.

When acceleration is applied to the acceleration sensor, the inertial mass 11 is displaced in the opposite direction of the acceleration in accordance with the law of inertia. The amount of displacement at this point is calculated by a change in the electrostatic capacitance between the movable electrodes 13 and the fixed electrodes 14. Specifically, the electrostatic capacitance change between the pad patterns 15a connected to the fixed electrodes 14 and the pad patterns 15b connected to the movable electrodes 13 is converted into a voltage change by the capacitance/voltage (CV) conversion circuit 17 outside the sensor chip 10, and the amount of change of the voltage is detected and converted into the amount of displacement of the inertial mass 11. The electric potential difference between the movable electrodes 13 and the fixed electrodes 14 is measured by a carrier wave generated and demodulated by the carrier wave application circuit 18 and the demodulation circuit 19.

In this process, based on the voltage output from the demodulation circuit 19, the same electric potential as the electric potential of the movable electrodes 13 is applied via the voltage adjustment circuit 20 to the pad pattern 15c which is connected to the peripheral conductor 16 (first and second peripheral conductors) on the sensor chip 10. Further, the pad pattern 15b electrically connected to the movable electrodes 13 and the pad patterns 15d electrically connected to the peripheral conductors (third peripheral conductors) of the restriction means 25 which restricts the sensor operation are electrically short-circuited by providing wiring. When the electric potential of the peripheral conductors 16a and 16b and the electric potential of the movable electrodes 13 are made equal to each other in this manner, the operation of the sensor can be stabilized. The principles thereof will be described with reference to the circuit diagram shown in FIG. 5.

Figure 5:
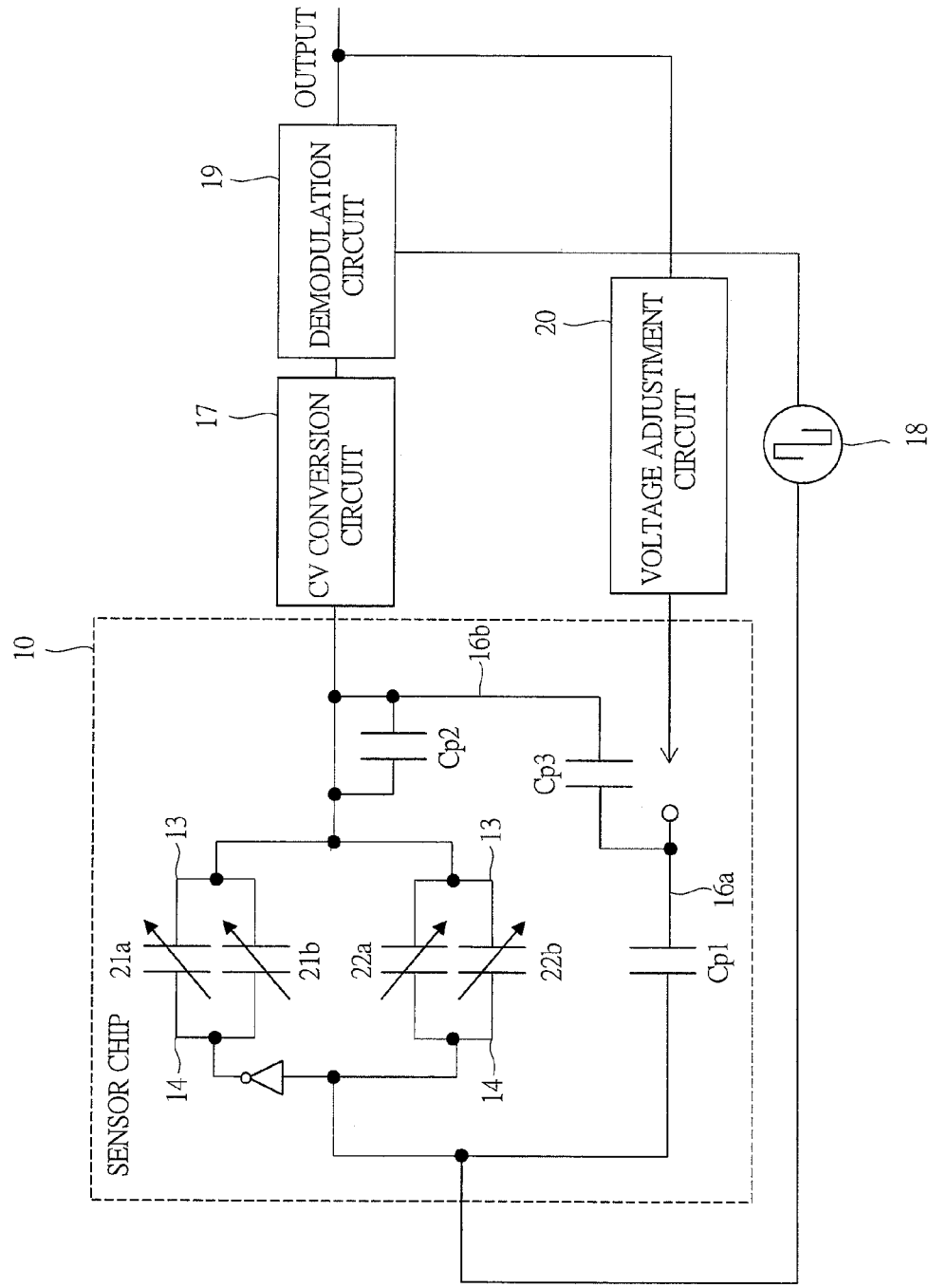
FIG. 5 is a circuit diagram of the inertial sensor according to the second embodiment of the present invention.

FIG. 5 is a circuit diagram rewritten from the schematic diagram of the sensor chip 10 shown in FIG. 4.

The sensor chip 10 comprises: two types of the four capacitance-variable capacitors 21a, 21b, 22a, and 22b configured of the fixed electrodes 14 and the movable electrodes 13; the peripheral conductor (A) 16a which serves as parasitic capacitance with respect to the fixed electrodes 14; and the peripheral conductor (B) 16b which serves as parasitic capacitance with respect to the movable electrodes 13 and whose distance to the movable electrode 13 is varied when the movable body is operated. When acceleration is applied to the sensor, the inertial mass is displaced in the opposite direction of the acceleration in accordance with the law of inertia, and the electrostatic capacitance between the movable electrodes 13 and the fixed electrodes 14 is changed. In other words, the capacitance of the capacitance-variable capacitors 21a, 21b, 22a, and 22b is changed. The change in the capacitance values is converted into a voltage change by the capacitance/voltage (CV) conversion circuit 17 outside the sensor chip 10, and the amount of change in the voltage is detected and converted into the amount of displacement of the inertial mass 11. The electric potential difference between the movable electrodes 13 and the fixed electrodes 14 is measured by the carrier wave generated and demodulated by the carrier-wave application circuit 18 and the demodulation circuit 19.

The peripheral conductor has a portion (16a) serving as the parasitic capacitance Cp1 with respect to the fixed electrodes 14, a portion (16b) serving as the parasitic capacitance Cp2 merely with respect to the movable electrodes 13, and a portion serving as the parasitic capacitance Cp3 between the peripheral conductors 16a and 16b. When the same electric potential as the electric potential of the movable electrodes 13 is applied to the peripheral conductor 16a via the voltage adjustment circuit 20 based on the voltage output from the demodulation circuit 19 and further the movable electrodes 13 and the peripheral conductor 16b are made to have the same electric potential by electrically short-circuiting the movable electrodes 13 and the peripheral conductor 16b, the effects of the parasitic capacitance caused by the peripheral conductor can be suppressed without affecting the capacitance values of the capacitance-variable capacitors 21a, 21b, 22a, and 22b configured of the fixed electrodes 14 and the movable electrodes 13. The principles thereof will be described with reference to the circuit diagrams shown in FIGS. 6A and 6B.

Figure 6A:
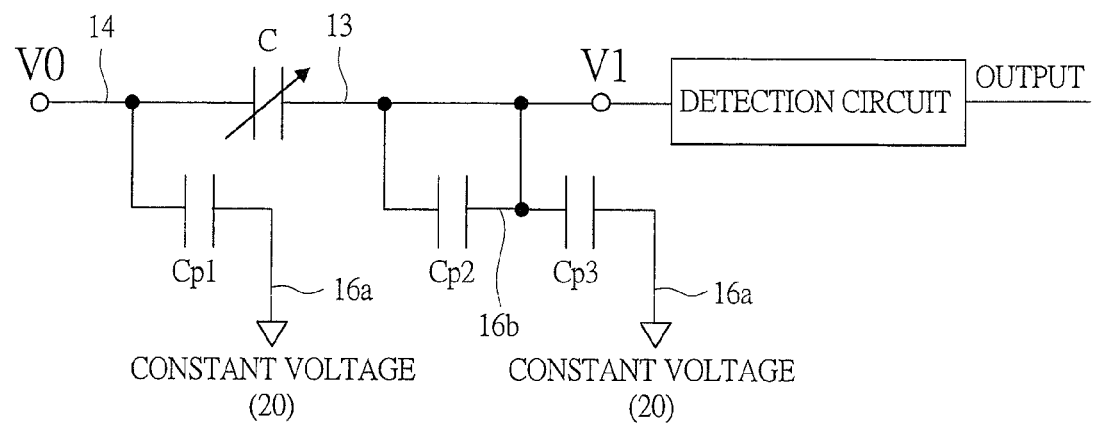
FIG. 6A is a diagram in which the parasitic capacitance generated in the second embodiment of the present invention is directly electrically connected to movable electrodes so as to achieve the same electric potential.

FIG. 6A is the circuit diagram of the case described in FIG. 5 in which the same electric potential V1 as that of the movable electrodes 13 is applied to the peripheral conductor 16a, which serves as parasitic capacitance with respect to the fixed electrodes 14, via the voltage adjustment circuit 20, and the peripheral conductor 16b, which serves as parasitic capacitance with respect to the movable electrodes 13, is directly connected to the movable electrodes 13 without the interposition of the voltage adjustment circuit 20. In the case of the configuration of FIG. 6A, when the electric potential difference (V1−V0) of the movable electrodes 13 and the fixed electrodes 14 of the sensor is measured by the detection circuit, even when the values of the parasitic capacitance Cp1, Cp2, and Cp3 undergo temporal change, the electric potential difference (V1−V0) of the movable electrodes 13 and the fixed electrodes 14 is not affected by the peripheral conductor 16b, and therefore, the capacitance C of the capacitance-variable capacitors 21a, 21b, 22a, and 22b can be always precisely obtained.

Figure 6B:
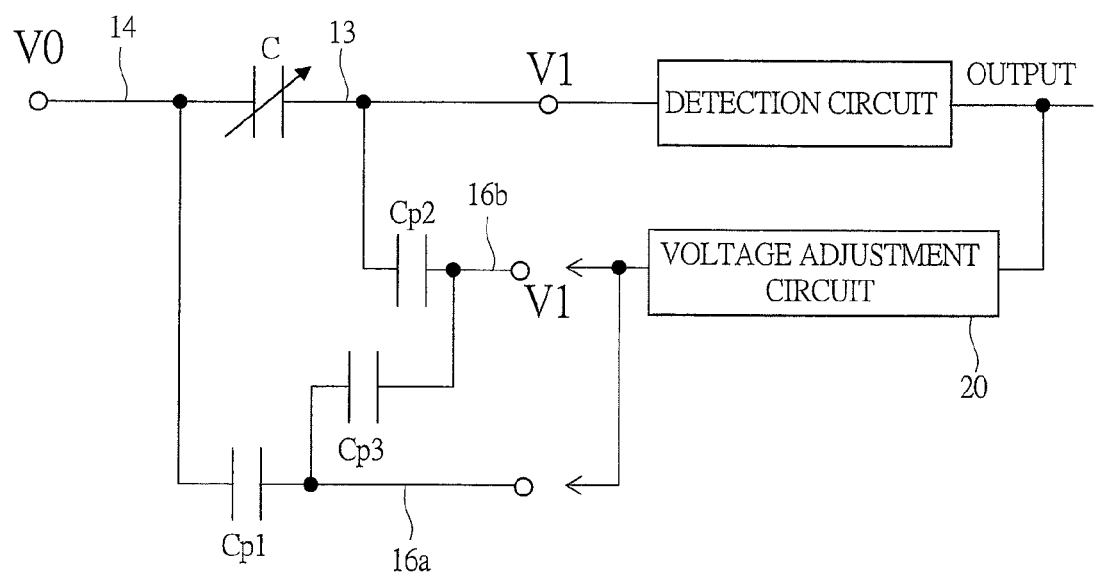
FIG. 6B is a diagram in which the parasitic capacitance generated in the second embodiment of the present invention is made to have the same electric potential as the movable electrodes via a voltage adjustment circuit.

FIG. 6B is the circuit diagram of the case in which the same electric potential V1 as that of the movable electrodes 13 is applied to the peripheral conductors 16a and 16b, which serve as the parasitic capacitance with respect to the fixed electrodes 14 and the movable electrodes 13, via the voltage adjustment circuit 20. In the case of the configuration of FIG. 6B, even when the values of the parasitic capacitance Cp1, Cp2, and Cp3 undergo temporal change, the electric potential difference (V1−V0) of the movable electrodes 13 and the fixed electrodes 14 is not affected, and therefore, the capacitance C of the capacitance-variable capacitors 21a, 21b, 22a, and 22b can be always precisely obtained.

In other words, the capacitance C of the capacitance-variable capacitors 21a, 21b, 22a, and 22b can be precisely obtained in both the case in which the same electric potential as that of the movable electrodes 13 is applied to the peripheral conductor 16b, which serves as the parasitic capacitance with respect to the movable electrodes 13, via the voltage adjustment circuit 20 and the case in which the peripheral conductor 16b is made to have the same electric potential by directly electrically short-circuiting with the movable electrodes 13. Note that, as described in the first embodiment (FIG. 3), unless the same electric potential as that of the movable electrodes 13 is applied to the peripheral conductor 16a, which serves as the parasitic capacitance with respect to the fixed electrodes 14, via the voltage adjustment circuit 20, the capacitance C of the capacitance-variable capacitors 21a, 21b, 22a, and 22b cannot be precisely obtained.

In the above-described manner, the same electric potential as the electric potential of the movable electrodes 13 is applied to the peripheral conductor 16a, which serves as the parasitic capacitance with respect to the fixed electrodes 14, via the voltage adjustment circuit 20 based on the voltage output from the demodulation circuit 19, and the peripheral conductor 16b, which serves as the parasitic capacitance with respect to the movable electrodes 13, is made to have the same electric potential by directly electrically short-circuiting with the movable electrodes 13, whereby the effects of the parasitic capacitance caused by the peripheral conductors 16a and 16b can be suppressed without affecting the capacitance values of the capacitance-variable capacitors 21a, 21b, 22a, and 22b configured of the fixed electrodes 14 and the movable electrodes 13. In other words, fixation between the movable electrodes 13 and the fixed electrodes 14 is suppressed so as to prevent the sensor from malfunctioning, and at the same time, the effects of suppressing the S/N ratio reduction of the sensor output and occurrence of offset caused by the parasitic capacitance between the fixed electrodes 14 and the peripheral conductors 16a and 16b can be obtained.

Third Embodiment

Figure 7:
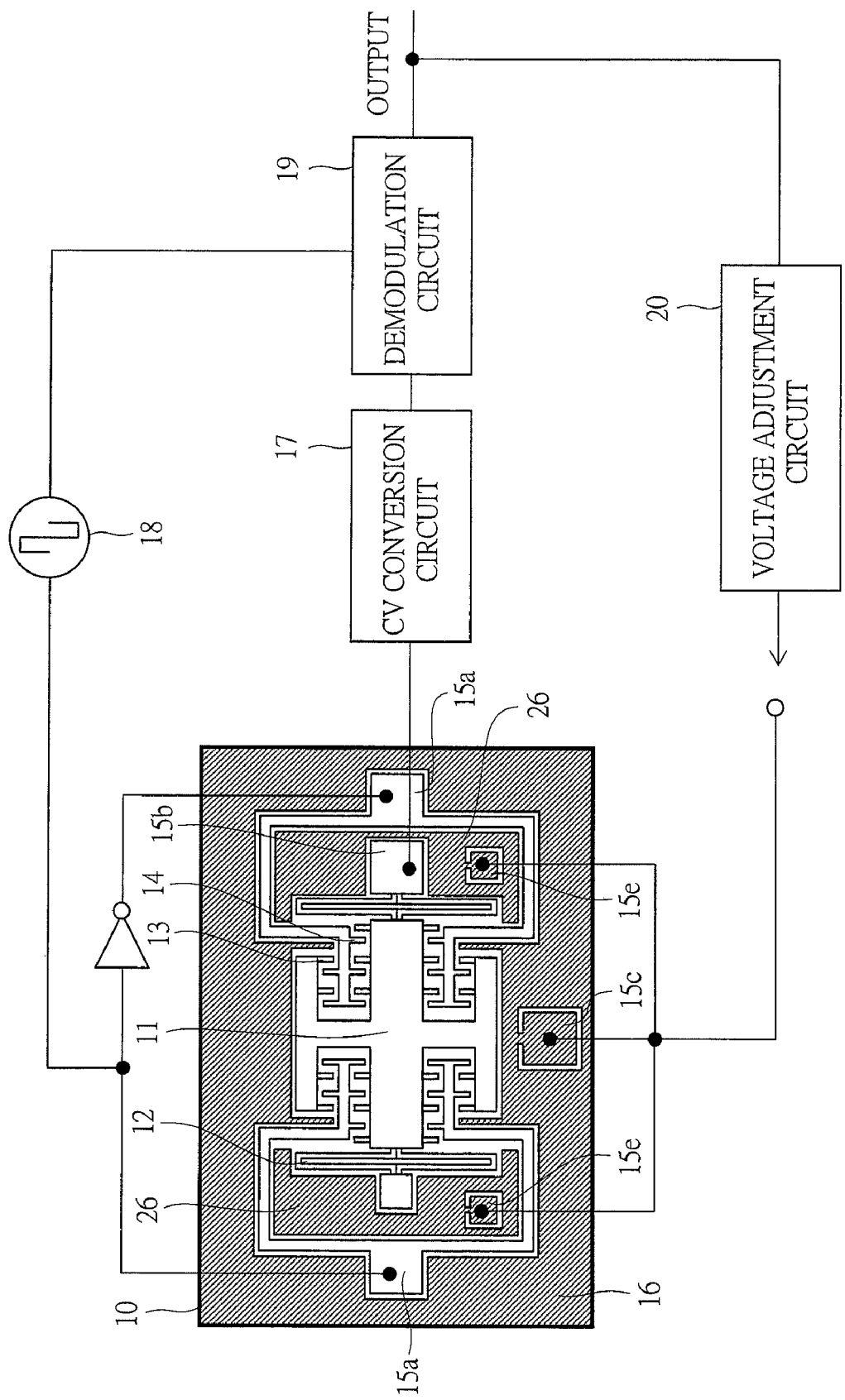
FIG. 7 is a wiring diagram of a chip and a detection circuit of an inertial sensor according to a third embodiment of the present invention.

FIG. 7 shows a chip overview and wiring of an acceleration sensor according to a third embodiment of the present invention.

The acceleration sensor serving as an inertial sensor according to the third embodiment comprises: the sensor chip 10; the capacitance/voltage (CV) conversion circuit 17 serving as a detection circuit; the carrier-wave application circuit 18; the demodulation circuit 19; the voltage adjustment circuit 20 serving as a control circuit; and others. The inertial mass 11, the supporting beam structures 12 of the inertial body, the movable electrodes 13 and the fixed electrodes 14 for detecting the travel distance of the inertial body, and pad patterns 15a to 15c and 15e for connecting the sensor chip 10 with detection circuit elements are formed on the sensor chip 10. Also, the conductor 16 is provided so as to surround the peripheries of these sensor constituent elements. When acceleration is applied to the sensor, the inertial mass 11 is displaced in the opposite direction of the acceleration in accordance with the law of inertia. The amount of displacement at this point is calculated by a change in the electrostatic capacitance between the movable electrodes 13 and the fixed electrodes 14. Specifically, the electrostatic capacitance change between the pad patterns 15a connected to the fixed electrodes 14 and the pad pattern 15b connected to the movable electrodes 13 is converted into a voltage change by the capacitance/voltage (CV) conversion circuit 17 outside the sensor chip 10, and the amount of change in the voltage is detected and converted into the amount of displacement of the inertial mass 11. The electric potential difference between the movable electrodes 13 and the fixed electrodes 14 is measured by the carrier wave generated and demodulated by the carrier-wave application circuit 18 and the demodulation circuit 19.

In this process, the same electric potential as the electric potential of the movable electrodes 13 is applied to the pad pattern 15c, which is connected to the peripheral conductor 16 on the sensor chip 10, via the voltage adjustment circuit 20 based on the voltage output from the demodulation circuit 19. The peripheral conductor 16 is not necessarily present outside the inertial body wiring, and it may be present in the regions surrounded by the wiring of the inertial body (peripheral conductors 26), but by applying the same electric potential as the electric potential of the movable electrodes 13 also to the pad patterns 15e, which are connected to the peripheral conductors 26, via the voltage adjustment circuit 20, the operation of the sensor can be stabilized for the same reasons as those of the first embodiment and the second embodiment.

Figure 8A:
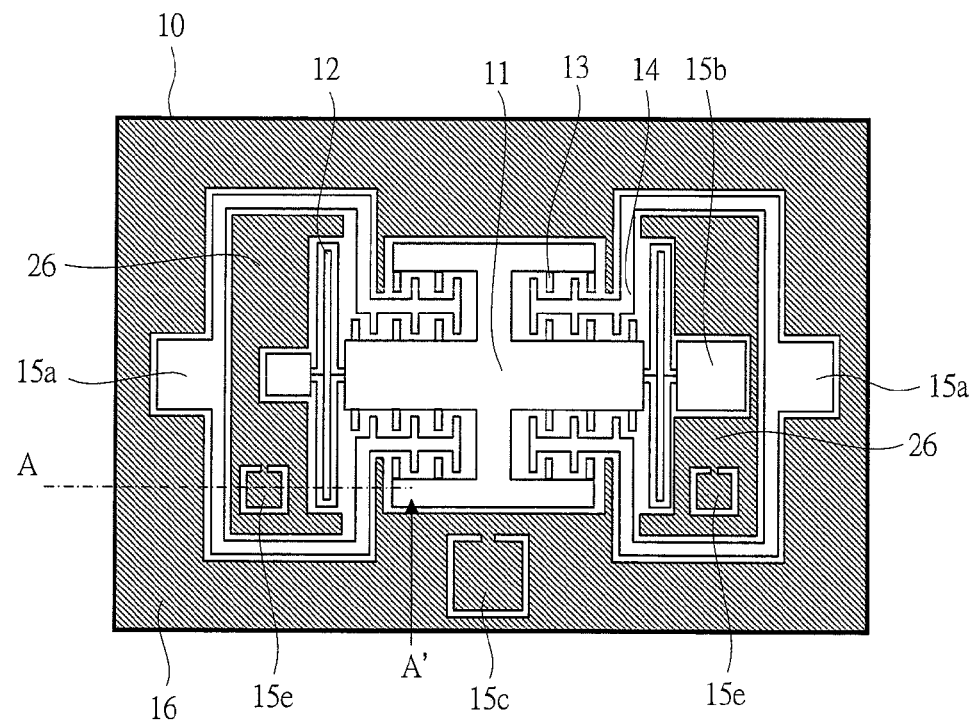
FIG. 8A is a top view of the chip of the inertial sensor according to the third embodiment of the present invention.
Figure 8B:
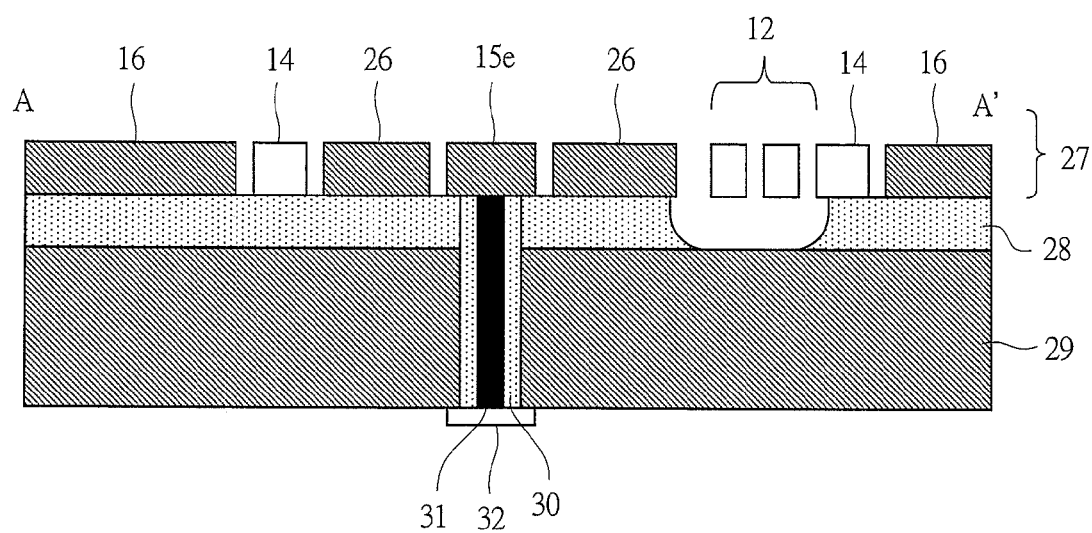
FIG. 8B is a cross sectional view showing the principal part of the inertial sensor taken along the line A-A' in FIG. 8A.

FIGS. 8A and 8B show an example of the method of ensuring electric connection with the peripheral conductor 26 present in the region surrounded by the wiring of the inertial body.

As shown in FIG. 8A, the inertial mass 11, the supporting beam structures 12 of the inertial body, the movable electrodes 13 and the fixed electrodes 14 for detecting the travel distance of the inertial body, and the pad patterns 15a to 15c and 15e for connecting the sensor chip 10 with detection circuit elements are formed on the sensor chip 10. Also, the peripheral conductors 16 and 26 are provided so as to surround the peripheries of these sensor constituent elements.

FIG. 8B is a cross sectional view taken along the dashed-dotted line A-A' in FIG. 8A. This is the structure in which the inertial body structure is formed in a silicon active layer 27 of a SOI wafer and a BOX oxide film 28 is utilized for a sacrifice layer. The peripheral conductors 26 present in the regions surrounded by the wiring of the inertial body and the pad patterns 15e electrically connected to the peripheral conductors 26 are present in the regions surrounded by the wiring of the inertial body.

For example, the manufacturing process for ensuring electrical connection between the pad pattern 15e and the rear surface of the wafer and forming a pad pattern 32 is as described below. A pattern corresponding to the pad pattern 15e is formed by a photolithography step on a silicon handle layer 29 from the rear surface of the sensor chip 10, and the silicon handle layer 29 is removed by etching up to the BOX oxide film 28 by deep etching techniques. Subsequently, the BOX oxide film 28 is removed up to the silicon active layer 27 by dry etching. Thus, a through hole connecting the rear surface of the sensor chip and the silicon active layer 27 constituting the sensor inertial body is formed. Then, in order to ensure electrical insulation from the silicon handle layer 29, a thermally-oxidized silicon film 30 is formed to have a thickness that does not fill the through hole. Then, conductive polysilicon 31 serving as electrical wiring is formed so as to fill the through hole. Furthermore, the rear surface of the sensor chip 10 is subjected to CMP, and then the pad pattern 32 is formed from aluminum which is a conductive metal. In this manner, the electrical connection between the pad pattern 15e and the rear surface of the wafer can be ensured.

Note that there is another method of ensuring the electrical connection other than forming the lead-out through electrode in the rear surface of the sensor chip 10 from the pad pattern 15e electrically connected to the peripheral conductor 26 which is present in the region surrounded by the inertial body wiring shown in FIG. 8. It is the method of utilizing the wire bonding for the connection with the pad patterns 15e and 15c on the upper surface of the sensor chip 10 or the connection with pad patterns of the detection circuit.

When the same electric potential as the electric potential of the movable electrodes 13 is applied in this manner to the peripheral conductors 16 and 26 based on the voltage output from the demodulation circuit 19 via the voltage adjustment circuit 20, the effects of the parasitic capacitance caused by the peripheral conductors 16 and 26 can be suppressed without affecting the capacitance values of the capacitance-variable capacitors configured of the fixed electrodes 14 and the movable electrodes 13. In other words, the fixation between the movable electrodes 13 and the fixed electrodes 14 is suppressed so as to prevent the sensor from malfunctioning, and the effects of suppressing the S/N ratio reduction of the sensor output and occurrence of offset caused by the parasitic capacitance between the fixed electrodes 14 and the peripheral conductors 16 and 26 can be obtained.

Fourth Embodiment

Figure 9:
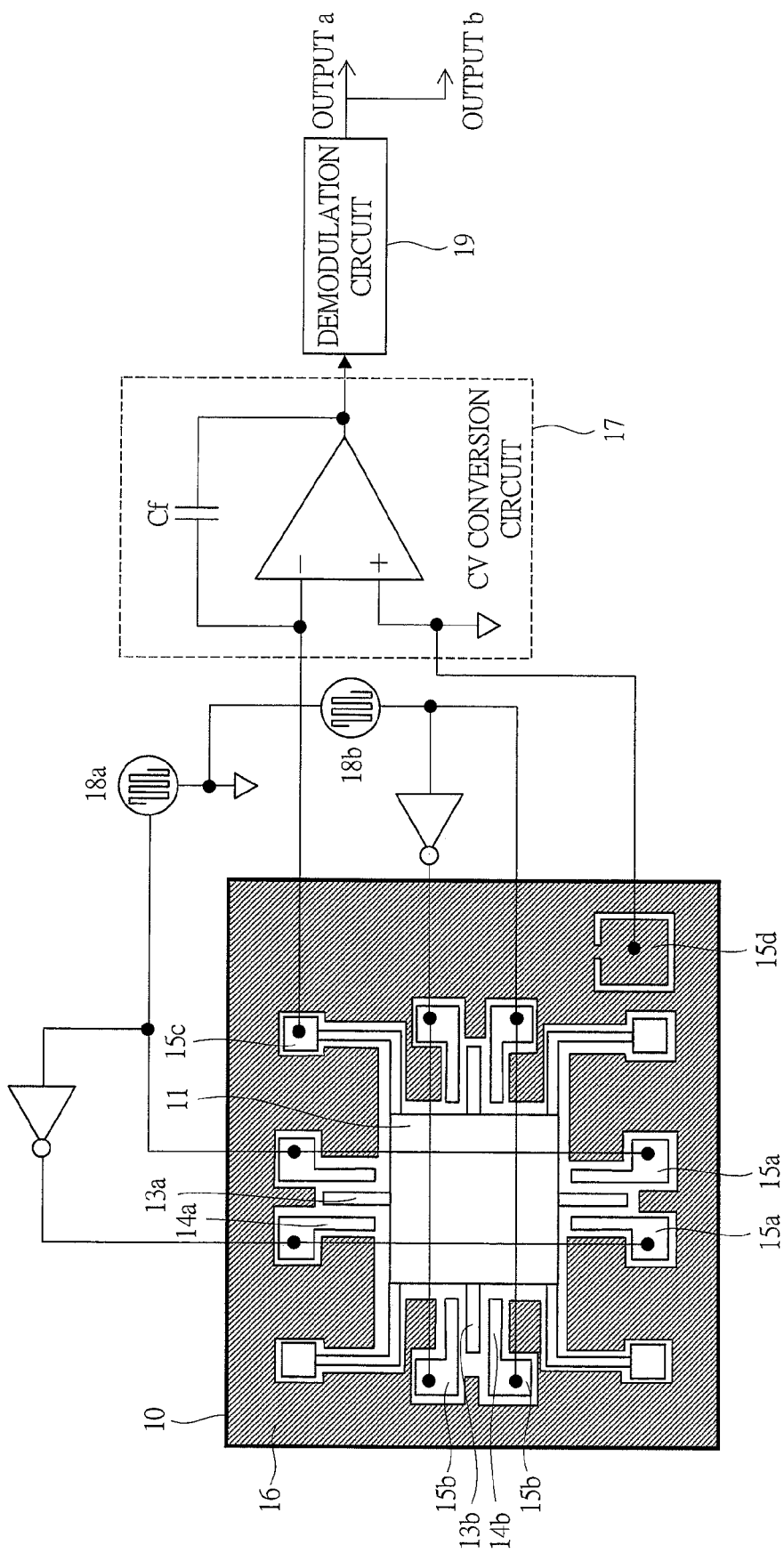
FIG. 9 is a wiring diagram of a chip and a detection circuit of an inertial sensor according to a fourth embodiment of the present invention.

FIG. 9 shows a schematic diagram of a chip overview and wiring of an acceleration sensor according to a fourth embodiment of the present invention.

The acceleration sensor serving as an inertial sensor according to the fourth embodiment comprises: the sensor chip 10; the capacitance/voltage (CV) conversion circuit 17 serving as a detection circuit; carrier-wave application circuits 18a and 18b; the demodulation circuit 19; and others.

The acceleration sensor of the fourth embodiment is an acceleration sensor having a plurality of outputs capable of outputting acceleration signals of two mutually-orthogonal directions. When acceleration is applied thereto in a first direction of the acceleration sensor, the inertial mass 11 is displaced in the opposite direction of the acceleration in accordance with the law of inertia. The amount of displacement at this point is calculated by the change in the electrostatic capacitance between movable electrodes 13a and fixed electrodes 14a. Specifically, the electrostatic capacitance change between the pad patterns 15a connected to the fixed electrodes 14a and the pad patterns 15c connected to the movable electrodes 13a is converted into a voltage change by the capacitance/voltage (CV) conversion circuit 17 outside the sensor chip 10, and the amount of change of the voltage is detected and converted into the amount of displacement of the inertial mass 11 in the first direction. The electric potential difference between the movable electrodes 13a and the fixed electrodes 14a is measured by a carrier wave generated and demodulated by the carrier-wave application circuit 18a and the demodulation circuit 19.

Similarly, in the case of the acceleration in the second direction, the electric potential difference by the change in the electrostatic capacitance between movable electrodes 13b and fixed electrodes 14b is measured by using a carrier wave generated and demodulated by the carrier-wave application circuit 18b and the demodulation circuit 19.

However, when there are a plurality of outputs from the demodulation circuit 19, it becomes impossible to determine which signal should be processed by the above described voltage adjustment circuit 20 and applied to the peripheral conductor 16. Therefore, in the acceleration sensor of the fourth embodiment, in order to prevent noise leakage to the CV conversion circuit 17 caused by capacitive coupling between the peripheral conductor 16 and the movable electrodes 13a and 13b, the fixed electrodes 14a and 14b or the inertial mass 11, the electric potential of the peripheral conductor 16 is set to a constant DC level. Particularly, in order to prevent occurrence of fixation between the inertial mass 11 and the peripheral conductor caused by electrostatic attractive force and electrostatic spring effects in which the unique vibration frequency is changed by the electrostatic force, the electric potential of the peripheral conductor 16 is set to the DC level potential of the inertial mass 11, in other words, the electric potential of the positive (+) terminal of the CV conversion circuit 17.

Also for the carrier waves of the carrier-wave application circuits 18a and 18b applied to the fixed electrodes 14a and 14b, in order to prevent generation of electrostatic attractive force between the movable electrodes 13a and 13b and fixation of the movable electrodes 13a and 13b and the fixed electrodes 14a and 14b, the DC level potential is set to the DC level potential of the inertial mass 11, in other words, the electric potential of the positive (+) terminal of the CV conversion circuit 17.

However, regarding the electric potential difference between the peripheral conductor 16 and the inertial mass 11, even when the electric potentials are made equal to each other in the DC level, they do not match in the AC level because the carrier waves of the carrier-wave application circuits 18a and 18b are transmitted to the inertial mass 11 via the electrostatic capacitance between the movable electrodes 13a and 13b and the fixed electrodes 14a and 14b and the plurality of carrier-wave signals having different frequencies are mutually combined in the principles of the CV conversion method.

Furthermore, the carrier waves of the carrier-wave application circuits 18a and 18b are formed as two signals having mutually opposite phases and applied to the symmetrically-disposed fixed electrodes, respectively, (for example, the carrier wave of the carrier wave application circuit 18a is applied to the fixed electrodes 14a which are symmetrically disposed with respect to the movable electrode 13a). Therefore, ideally, the AC components of the carrier waves of the carrier-wave application circuits 18a and 18b are cancelled out by each other and do not affect the inertial mass 11. However, it is conceivable that the phases of the carrier waves of the carrier-wave application circuits 18a and 18b are shifted to some extent by a delay factor such as variation in wiring resistance.

As a result, the main AC components present in the inertial mass 11 include a part of the AC components of the carrier waves of the carrier-wave application circuits 18a and 18b in the range of several hundred kHz and a beat frequency component generated by the frequency difference between the carrier waves of the carrier-wave application circuits 18a and 18b in the range of several tens of kHz. However, since general acceleration sensors often have mechanical responsivity of several ten to several hundred Hz, even if these AC components are present between the inertial mass 11 and the peripheral conductor 16, the inertial mass 11 cannot mechanically track them and is not affected. Because of the above described principles, when the electric potential of the peripheral conductor 16 is set to the DC level potential of the inertial mass 11, malfunction of the acceleration sensor caused by the electrostatic force acting between the peripheral conductor 16 and the inertial mass 11, fixation, and noise leakage caused by capacitive coupling of the parasitic capacitance can be prevented, and the stable operation and the highly-sensitive signal detection can be achieved.

Figure 10:
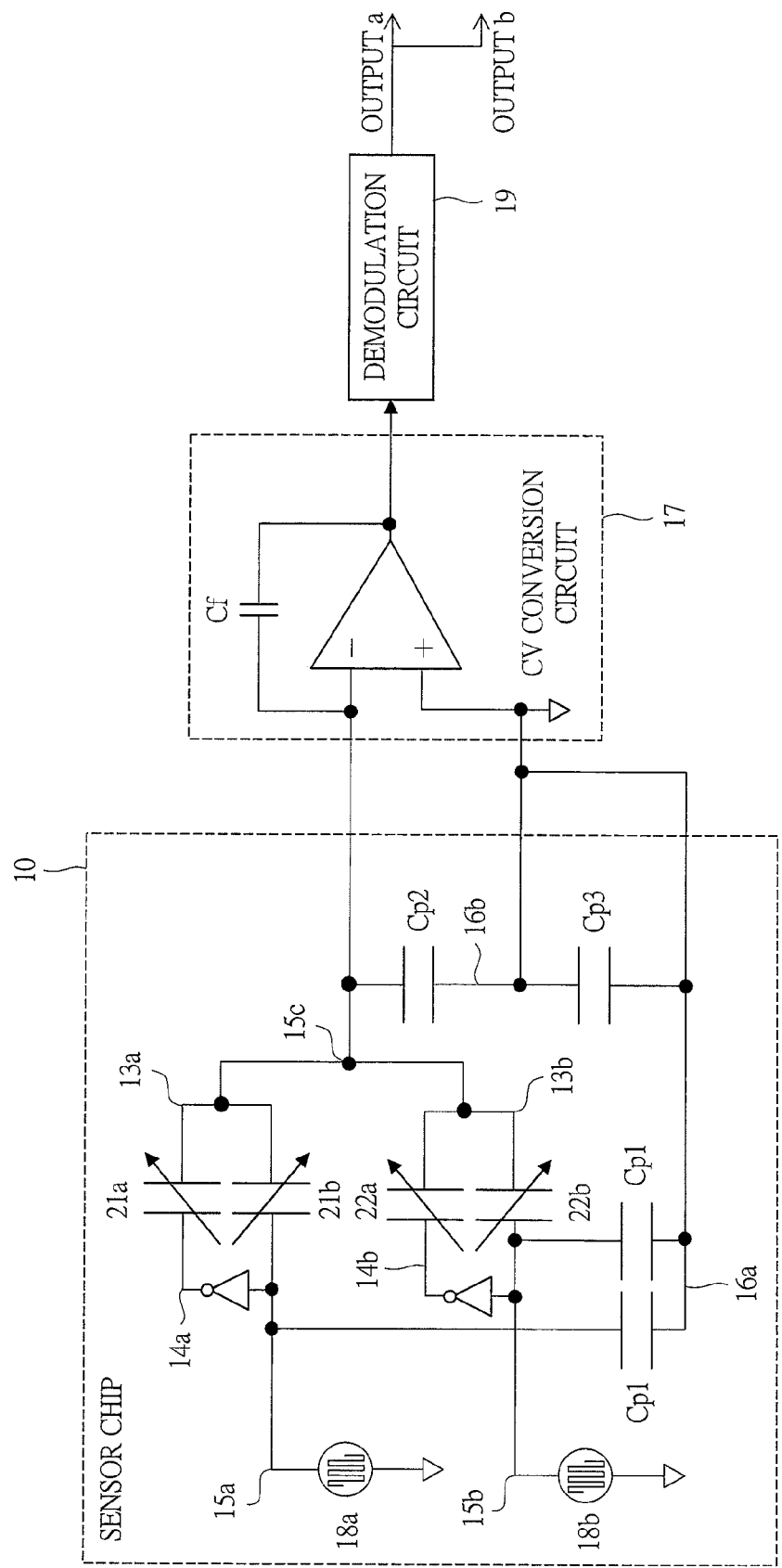
FIG. 10 is a circuit diagram of the inertial sensor according to the fourth embodiment of the present invention.

FIG. 10 is a circuit diagram rewritten from the schematic diagram of the sensor chip 10 shown in FIG. 9. The parasitic capacitance formation and electric potential fixation with the peripheral conductor 16 will be described with reference to this diagram.

The sensor chip 10 comprises: the capacitance-variable capacitors 21a, 21b, 22a, and 22b configured of the movable electrodes 13a and 13b and the fixed electrodes 14a and 14b and used in the acceleration detection in the first and second directions; the peripheral conductor (A) 16a which forms the parasitic capacitance Cp1 with respect to the fixed electrodes 14a and 14b; the peripheral conductor (B) 16b which forms the parasitic capacitance Cp2 with respect to the movable electrodes 13 and whose distances to the movable electrodes 13a and 13b are varied when the movable bodies are operated; and the parasitic capacitance Cp3 which is formed between the peripheral conductors 16a and 16b.

As described above, when acceleration is applied to the acceleration sensor, the inertial mass 11 is displaced in the opposite direction of the acceleration in accordance with the law of inertia, and the electrostatic capacitance between the movable electrodes 13a and 13b and the fixed electrodes 14a and 14b is changed. In other words, the capacitance of the capacitance-variable capacitors 21a, 21b, 22a, and 22b is changed. This change in the capacitance value is converted into a voltage change by the capacitance/voltage conversion circuit 17 outside the sensor chip 10, and the amount of change of the voltage is detected and converted into the amount of displacement of the inertial mass 11. The electric potential differences between the movable electrodes 13a and 13b and the fixed electrodes 14a and 14b are measured by carrier waves generated and demodulated by the carrier-wave application circuits 18 and the demodulation circuit 19.

The peripheral conductors 16a and 16b have a portion (16a) which serves as the parasitic capacitance Cp1 with respect to the fixed electrodes 14a and 14b, a portion (16b) which serves as the parasitic capacitance Cp2 with respect to the movable electrodes 13a and 13b, and a portion which is formed by both the peripheral conductors 16a and 16b and serves as the parasitic capacitance Cp3. In the acceleration sensor of the fourth embodiment, although it is not illustrated, for example, as shown in FIG. 8B, peripheral conductors are present below or above the fixed electrodes 14a and 14b, the movable electrodes 13a and 13b, and the inertial mass 11 in many cases like the silicon handle layer 29, and these are also formed as parasitic capacitance Cpx.

In the acceleration sensor of the fourth embodiment, the above listed peripheral conductors, that is, the peripheral conductors 16a and 16b having the electric potentials which cannot be usually specified are fixed to the constant electric potential. Particularly, in order to prevent occurrence of fixation caused by the electrostatic attractive force between the inertial mass 11 and the peripheral conductors 16a and 16b and the electrostatic spring effects in which the unique vibration frequencies are varied in accordance with the electrostatic force, the electric potentials of the peripheral conductors 16a and 16b are connected to the DC level potential of the inertial mass 11, in other words, to the electric potential of the positive (+) terminal of the CV conversion circuit 17 as shown in FIG. 10.

When the DC potential (potential of the positive (+) terminal) of the CV conversion circuit 17 is applied in this manner to the peripheral conductors 16a and 16b surrounding the acceleration sensor, the fixation and effects of the parasitic capacitance caused by the peripheral conductors 16a and 16b can be suppressed and leakage of noise from outside can be blocked without affecting the capacitance values of the capacitance-variable capacitors 21a, 21b, 22a, and 22b configured of the fixed electrodes 14a and 14b and the movable electrodes 13a and 13b. In other words, the fixation between the movable electrodes 13a and 13b and the fixed electrodes 14a and 14b is suppressed so as to prevent the sensor from malfunctioning, and at the same time, the generation of noise, S/N ratio reduction of the sensor output and offset occurrence caused by leakage of noise from outside due to the capacitive coupling between the fixed electrodes 14a and 14b and the peripheral conductors 16a and 16b or between the inertial mass 11 and the peripheral conductors 16a and 16b can be suppressed. Herein, the connection destination of the peripheral conductors 16a and 16b is not necessarily the positive (+) terminal of the CV conversion circuit 17 as long as the applied electric potential is the same as the electric potential applied to the positive (+) terminal.

Figure 11:
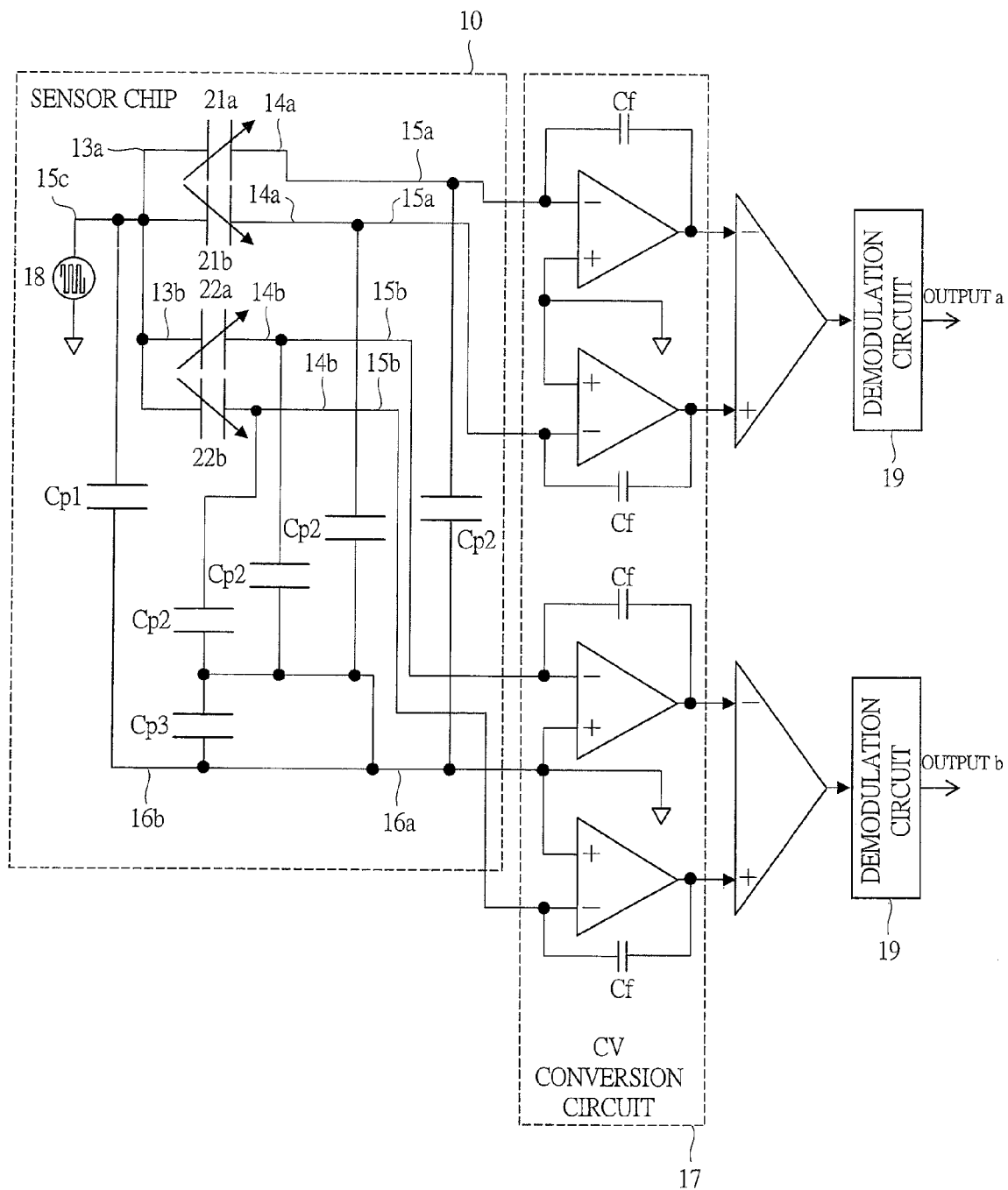
FIG. 11 is a circuit diagram showing another form of the inertial sensor according to the fourth embodiment of the present invention.

FIG. 11 is another example of the circuit configuration of the acceleration sensor of the fourth embodiment. Herein, a carrier wave from the carrier-wave application circuit 18 is applied to the inertial mass 11, and signals from the fixed electrodes 14a and 14b are input to the CV conversion circuit 17. The same members as those of FIG. 10 are denoted by the same reference numerals. Also in this circuit configuration, a constant electric potential, specifically, the same electric potential as the electric potential of the positive (+) terminal of the CV conversion circuit 17 is applied to the peripheral conductors 16a and 16b. The effects obtained by this are the same as those of FIG. 10 described above, and the idea of the present invention is not related to the method or the like of the circuit.

The acceleration sensors have been described in the above first to fourth embodiments, and an angular velocity sensor will be described in a fifth embodiment below.

Fifth Embodiment

Figure 12:
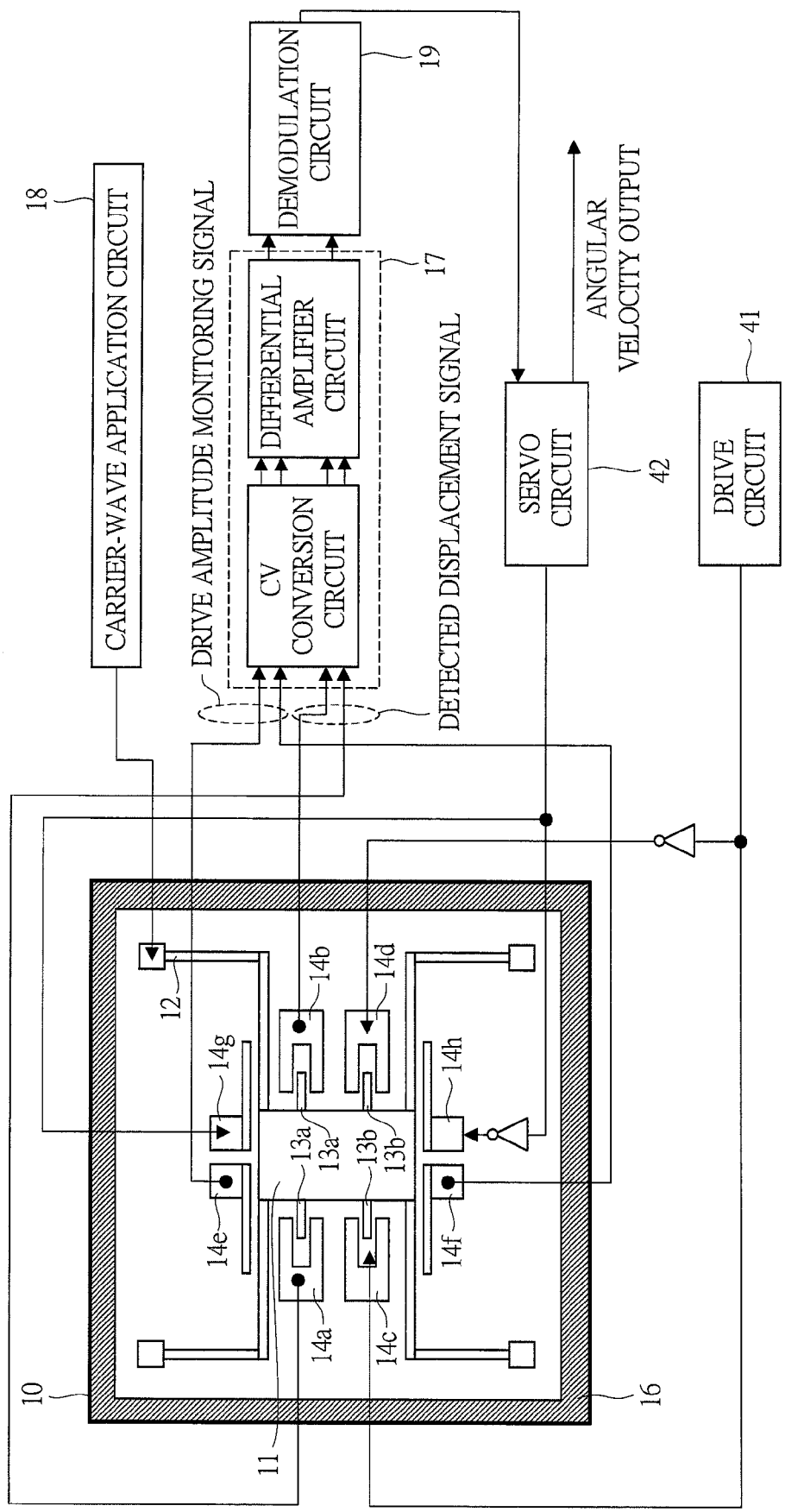
FIG. 12 is a wiring diagram of a chip and a detection circuit of an inertial sensor according to a fifth embodiment of the present invention.

FIG. 12 shows a schematic diagram of a chip overview and wiring of the angular velocity sensor according to the fifth embodiment of the present invention.

The angular velocity sensor serving as an inertial sensor according to the fifth embodiment comprises: the sensor chip 10; the capacitance/voltage (CV) conversion circuit (including a differential amplifier circuit) 17 serving as a detection circuit; the carrier-wave application circuit 18; the demodulation circuit 19; a drive circuit 41; a servo circuit 42; and others.

The sensor chip 10 of the angular velocity sensor of the fifth embodiment comprises: the inertial mass 11 which is suspended by the silicon handle layer 29 shown in FIG. 8B via the supporting beam structures 12; the movable electrodes 13a and 13b and fixed electrodes (specific function names will be described later) 14a to 14h for detecting the travel distance of the inertial body; and others. Specifically, the fixed electrodes 14a to 14h include: the drive electrodes 14c and 14d which are fixed to the silicon handle layer 29 and electrically connected to the drive circuit 41 for driving the inertial mass 11; the drive amplitude monitoring electrodes 14a and 14b for detecting the drive amplitude of the inertial mass 11 by a change in the electrostatic capacitance; the angular velocity detection electrodes 14e and 14f which detect, as a change in the electrostatic capacitance, the displacement of the inertial mass 11 displaced in the direction orthogonal to the drive direction proportional to the Coriolis force generated upon application of an angular velocity; and the servo electrodes 14g and 14h which generate electrostatic force in the inertial mass 11 for always maintaining/suppressing the displacement generated by the Coriolis force to a constant value (for example, 0).

The drive circuit 41 generates a signal for driving the inertial mass 11 in a drive direction. The angular velocity sensor of the fifth embodiment carries out the drive by a unique vibration frequency of the angular velocity sensor for obtaining a large drive amplitude with low energy consumption. Therefore, although it is not illustrated, the drive circuit 41 includes an Auto Frequency Control (AFC) circuit, and the drive signal which is always matched with the unique vibration frequency of the sensor is generated and applied to the drive electrodes 14c and 14d.

Furthermore, the drive circuit 41 also includes an Auto Gain Control (AGC) function which maintains the drive amplitude of the inertial mass 11 to be always constant, and the amplitude (AC amplitude) of the drive signal is adjusted and managed so that the output values from the drive amplitude monitoring electrodes 14a and 14b are always constant.

When an angular velocity (rotation) is applied in the state in which the inertial mass 11 is vibrating, the inertial mass 11 starts vibrating in the direction orthogonal to the drive direction by the Coriolis force. The vibration is detected by using the capacitance change of the angular velocity detection electrodes 14e and 14f. The applied angular velocity can be detected by subjecting the signals thereof to differential amplification by the differential amplifier circuit included in the CV conversion circuit 17, demodulating them by the demodulation circuit 19, and then outputting them. In the angular velocity sensor of the fifth embodiment, however, the signals from the angular velocity detection electrodes 14e and 14f are fed back to the servo circuit 42, and the signal which suppresses the displacement of the inertial mass 11 by the Coriolis force is applied to the servo electrodes 14g and 14h. Furthermore, the voltage applied to the servo electrodes 14g and 14h is directly used as an angular velocity output. The reason for using the servo function is already known, and it is for improving the robustness of the angular velocity output against the variations in peripheral environments such as the temperature and the ambient pressure.

The point is that, since the angular velocity sensor has to vibrate all the time, unlike the acceleration sensors described in the first to fourth embodiments, the angular velocity sensor necessarily has the electrodes of a drive system which emit signals from themselves like the drive electrodes 14c and 14d and the servo electrodes 14g and 14h. Moreover, in order to obtain a large drive amplitude, AC signals having large electric potentials such as several to several ten V are applied to the drive electrodes 14c and 14d. Note that the carrier wave of the carrier-wave application circuit 18 has a small AC amplitude of several to several hundred mV in many cases in order to stabilize the sensor operation and to reduce the noise generation.

Therefore, if capacitive coupling (parasitic capacitance) is present between the electrodes of the drive system (the drive electrodes 14c and 14d and the servo electrodes 14g and 14h) and the electrodes of the detection system (the drive amplitude monitoring electrodes 14a and 14b and the angular velocity detection electrodes 14e and 14f), a part of the drive signals leaks to the detection signals, and there occurs the problems that the CV conversion circuit 17 is saturated, an angular velocity signal output is output even when no angular velocity is applied (offset), and the feed-back system of the servo circuit 42 becomes unstable, so that the sensor cannot carry out the detection.

Figure 13:
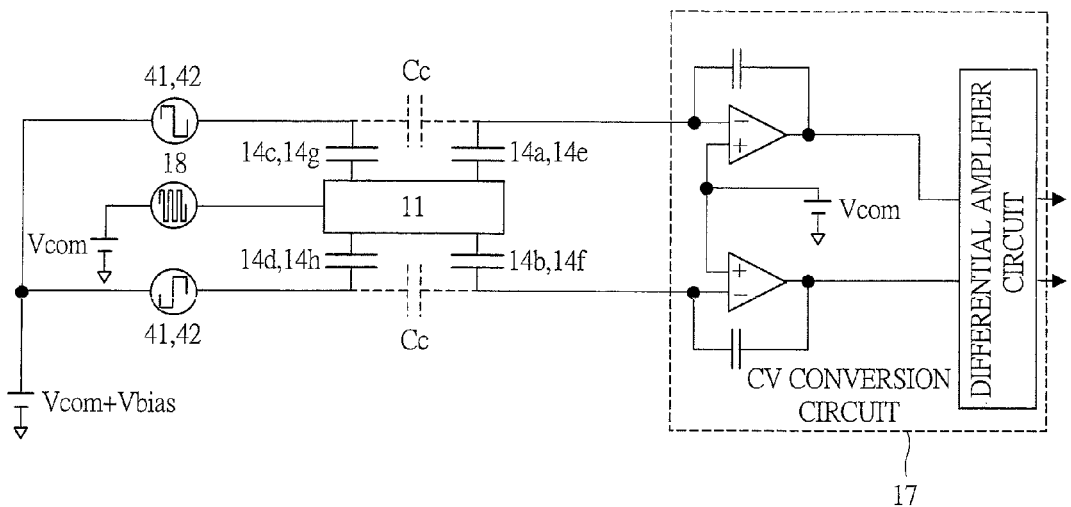
FIG. 13 is an explanatory diagram of capacitance coupling of the inertial sensor according to the fifth embodiment of the present invention.

FIG. 13 is a circuit diagram rewritten from the schematic diagram of the sensor chip 10 shown in FIG. 12, in which the electrodes of the drive system (the drive electrodes 14c and 14d and the servo electrodes 14g and 14h) and the electrodes of the detection system (the drive amplitude monitoring electrodes 14a and 14b and the angular velocity detection electrodes 14e and 14f) are illustrated in a simplified manner in order to facilitate the description of the capacitive coupling. When the electrodes of the drive system 14c, 14g, 14d, and 14h and the electrodes of the detection system 14a, 14e, 14b, and 14f are close to each other in terms of their positions, parasitic capacitance Cc is formed between the respective electrodes. The signals of the electrodes of the drive system leak to the electrodes of the detection system via the parasitic capacitance Cc and input to the CV conversion circuit 17.

In particular, drive signals and servo signals use rectangular waves in order to achieve the downsizing and cost reduction of an IC for angular velocity sensor control instead of sine waves in some cases. In the case of the rectangular waves, since many odd harmonics are contained other than fundamental frequency components, high frequency components more readily leak to the electrodes of the detection system via the parasitic capacitance Cc. For further downsizing and cost reduction of the IC for angular velocity sensor control, in many cases, frequencies obtained by multiplying the drive frequency by a number obtained by progressive increase of 2 are used as the frequencies used in the carrier-wave application circuit 18, the demodulation circuit 19, AD conversion after demodulation, and others. In this case, the signals obtained by multiplying the drive frequency by odd numbers have to be detected in the stage of demodulation, and they cannot be distinguished from the odd harmonics of the drive signal generated by the rectangular waves. As a result, the detection signal becomes noise, whereby S/N is reduced and offset in which a signal is output even though inertial force is not applied occurs.

Figure 14:
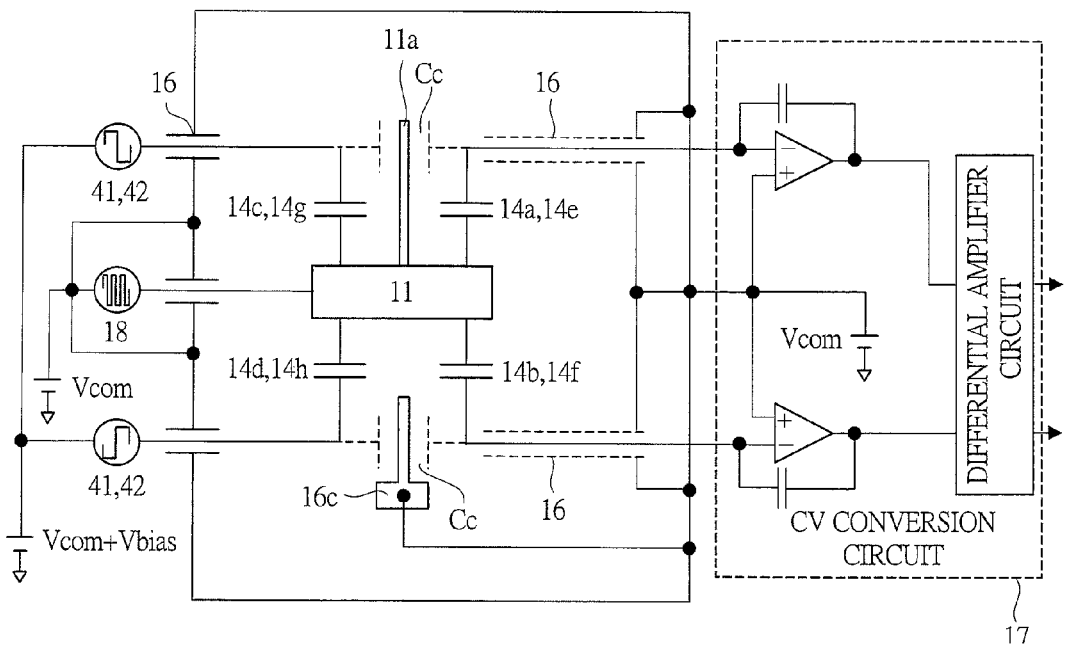
FIG. 14 is an explanatory diagram of a modified form of the inertial sensor according to the fifth embodiment of the present invention.

Therefore, in order to prevent malfunctioning of the sensor such as high S/N and offset occurrence, the above described parasitic capacitance Cc has to be eliminated, or the coupling of the capacitance has to be blocked. FIG. 14 is a conceptual diagram of a modified form of an angular velocity sensor to which the present invention for solving the above described problems of FIG. 13 is applied. As shown in the diagram, the angular velocity sensor of the modified form is characterized in that the parasitic capacitance Cc which is the cause of the above described capacitive coupling is disabled and the peripheral conductor 16 is fixed to a constant electric potential, thereby shielding the electrodes and wiring electrodes so that the electrodes and the wiring do not generate or receive the noise. As the means of disabling the parasitic capacitance Cc, in the modified form, conductors having a fixed electric potential are inserted between the electrodes constituting the parasitic capacitance Cc. Specifically, a portion 16c of the peripheral conductor 16 and a portion 11a of the inertial mass 11 are disposed between the electrodes of the parasitic capacitance Cc, thereby disabling the parasitic capacitance Cc and blocking the capacitive coupling between the drive-system electrodes and the detection-system electrodes.

In this manner, the DC electric potential (the electric potential of the positive (+) terminal) of the CV conversion circuit 17 is applied to the peripheral conductor 16 surrounding the angular velocity sensor and to the portion 16c of the peripheral conductor 16 disposed between the electrodes of the parasitic capacitance Cc, and the portion 11a of the inertial mass 11 is extended to the part between the electrodes of the parasitic capacitance Cc. By this means, leakage of noise from outside or the drive-system electrodes to the detection-system electrodes can be blocked, and the angular velocity sensor having high S/N (high sensitivity) can be provided.

Figure 15:
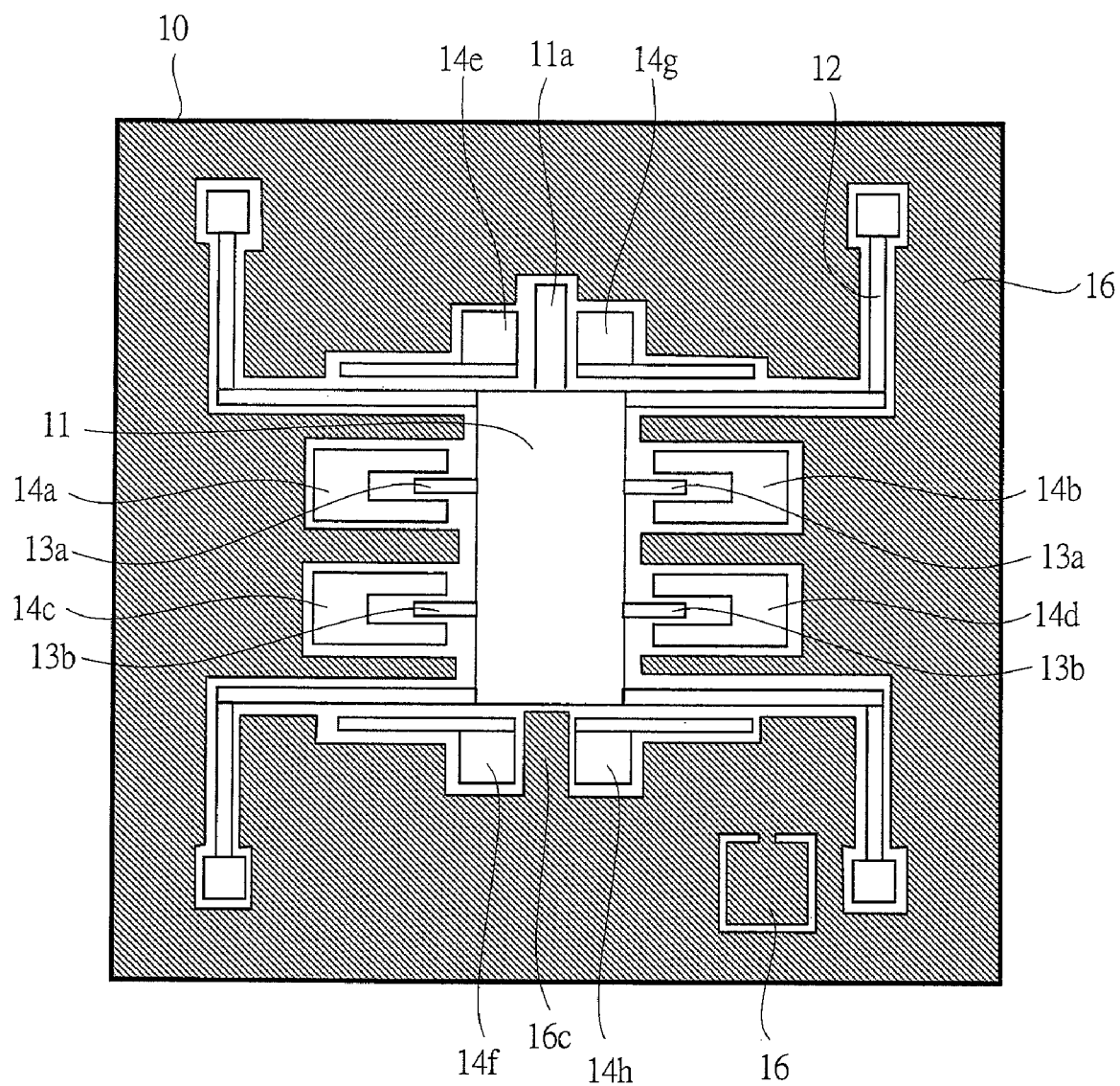
FIG. 15 is a schematic diagram of a modified form of the inertial sensor according to the fifth embodiment of the present invention.

FIG. 15 is a schematic diagram of the angular velocity sensor of the modified form described in FIG. 14. More specifically, the inertial mass 11, the supporting beam structures 12 of the inertial body, the movable electrodes 13a and 13b, the drive electrodes 14c and 14d and the servo electrodes 14g and 14h serving as the drive-system electrodes and the drive amplitude monitoring electrodes 14a and 14b and the angular velocity detection electrodes 14e and 14f serving as the detection-system electrodes, the electrodes using the fixed electrodes, and pad patterns (reference numerals omitted) are formed on the sensor chip 10 of the angular velocity sensor of the modified form. Also, the peripheral conductor 16 is disposed so as to surround the peripheries of the sensor constituent elements. In addition, the portion 16c of the peripheral conductor 16 and the portion 11a of the inertial mass 11 are disposed between the electrodes of the parasitic capacitance.

In the foregoing, the invention made by the inventors of the present invention has been concretely described based on the embodiments. However, it is needless to say that the present invention is not limited to the foregoing embodiments and various modifications and alterations can be made within the scope of the present invention. Further, the above described first to fifth embodiments may be appropriately combined.

For example, the acceleration sensor and the angular velocity sensor have been described in the above described embodiments. However, the present invention is not limited to them but can be also applied to an inertial sensor such as a pressure sensor of the electrostatic capacitance type, and the effects of the present invention are particularly effective in the inertial sensors using the changes in the electrostatic capacitance for detection.

The present invention is effective for a semiconductor physical quantity sensor and is particularly effective in the inertial sensor fabricated by using the Micro-Electro-Mechanical Systems (MEMS) techniques.

What is claimed is:
1. An inertial sensor comprising:
    a movable electrode;
    a fixed electrode arranged so as to face the movable electrode;
    a peripheral conductor electrically separated from the movable electrode and the fixed electrode in a periphery of the movable electrode and the fixed electrode;
    a detection circuit for detecting a change in capacitance between the movable electrode and the fixed electrode; and
    a control circuit for adjusting an electrical potential of the peripheral conductor so that the electrical potential of the peripheral conductor is the same as an electrical potential of the movable electrode.
2. The inertial sensor according to claim 1, further comprising:
    a demodulation circuit,
    wherein the detection circuit is configured to convert the change in capacitance into a voltage change,
    wherein the demodulation circuit is configured to demodulate the voltage change, and
    wherein the control circuit is configured to adjust the electrical potential of the peripheral conductor based on an output of the demodulation circuit.
3. The inertial sensor according to claim 1,
    wherein the peripheral conductor includes a first peripheral conductor which faces both the movable electrode and the fixed electrode, a second peripheral conductor which faces the fixed electrode, and does not face the movable electrode, and a third peripheral conductor which faces the movable electrode and does not face the fixed electrode, and
    wherein the in inertial sensor further comprises wiring that connects the third peripheral conductor and the movable electrode so that an electric potential of the third peripheral conductor is the same as the electric potential of the movable electrode.
4. The inertial sensor according to claim 3,
    wherein the control circuit adjusts electric potentials of the first, second, and third peripheral conductors so that the electric potential of the first peripheral conductor is the same as the electric potential of the movable electrode.
5. The inertial sensor according to claim 1,
    wherein the electric potential of the peripheral conductor is the same as a DC level potential of the movable electrode.
6. The inertial sensor according to claim 3,
    wherein the electric potentials of the first, second, and third peripheral conductors are the same as a DC level potential of the movable electrode.
7. The inertial sensor according to claim 1,
    wherein a part of the fixed electrode is used as a drive electrode which faces the movable electrode and drives the movable electrode, and
    wherein another part of the fixed electrode is used as a detection electrode which faces the movable electrode and forms electrostatic capacitance.
8. The inertial sensor according to claim 7,
    wherein the peripheral conductor having a fixed constant electric potential is interposed between the drive electrode and the detection electrode, and the drive electrode and the detection electrode do not face each other.
9. The inertial sensor according to claim 7,
    wherein a part of the movable electrode is extended to a space between the drive electrode and the detection electrode, and the drive electrode and the detection electrode do not face each other.

* * * * *